(12) United States Patent
Wade

(10) Patent No.: US 10,999,587 B2
(45) Date of Patent: *May 4, 2021

(54) METHOD FOR PARALLEL IMAGE PROCESSING AND ROUTING

(71) Applicant: Jack Wade, La Jolla, CA (US)

(72) Inventor: Jack Wade, La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/695,021

(22) Filed: Nov. 25, 2019

(65) Prior Publication Data

US 2020/0228811 A1  Jul. 16, 2020

Related U.S. Application Data

(63) Continuation of application No. 16/171,210, filed on Oct. 25, 2018, now abandoned, which is a continuation of application No. 15/170,575, filed on Jun. 1, 2016, now Pat. No. 10,142,641, which is a continuation-in-part of application No. 13/430,489, filed on Mar. 26, 2012, now abandoned, which is a continuation-in-part of application No. 12/776,048, filed on May 7, 2010, now Pat. No. 8,266,333.

(60) Provisional application No. 61/234,577, filed on Aug. 17, 2009, provisional application No. 61/182,624, filed on May 29, 2009.

(51) Int. Cl.
| | |
|---|---|
| *H04N 19/436* | (2014.01) |
| *H04N 7/18* | (2006.01) |
| *G06F 13/40* | (2006.01) |
| *H04N 21/2187* | (2011.01) |
| *H04N 21/472* | (2011.01) |

(52) U.S. Cl.
CPC ....... *H04N 19/436* (2014.11); *G06F 13/4022* (2013.01); *H04N 7/181* (2013.01); *H04N 21/2187* (2013.01); *H04N 21/47202* (2013.01)

(58) Field of Classification Search
CPC ..... H04L 63/1425; G06F 21/55; G06F 21/577
USPC ...................................................... 710/8, 38
See application file for complete search history.

(56) References Cited

U.S. PATENT DOCUMENTS

| | | | | | |
|---|---|---|---|---|---|
| 5,694,150 | A | * | 12/1997 | Sigona | G06F 3/038 715/856 |
| 6,271,752 | B1 | * | 8/2001 | Vaios | G08B 13/19608 340/525 |
| 7,039,723 | B2 | * | 5/2006 | Hu | G06F 3/1454 709/248 |
| 8,063,936 | B2 | * | 11/2011 | Samarasekera | G06T 15/205 348/159 |
| 8,295,649 | B2 | * | 10/2012 | Berini | G08B 13/19656 382/304 |

(Continued)

*Primary Examiner* — Titus Wong
(74) *Attorney, Agent, or Firm* — Olivo IP Law Group, P.C.; John W. Olivo, Jr.

(57) ABSTRACT

Various embodiments relate to systems and methods for simultaneously switching input image streams to output devices, while providing optional image processing functions on the image streams. Certain embodiments may enable multiple users/viewers to collaboratively control such systems and methods. Additionally, some embodiments may enable control by a set of computer input devices (e.g., keyboard and mouse) to switch between multiple computer systems, possibly by following the movement of a computer input device cursor, between virtual displays, as the cursor is controlled by the set of computer input devices.

18 Claims, 26 Drawing Sheets

(56) References Cited

U.S. PATENT DOCUMENTS

| | | | | |
|---|---|---|---|---|
| 2002/0149617 A1* | 10/2002 | Becker | ................... | G16H 80/00 |
| | | | | 715/751 |
| 2006/0187359 A1* | 8/2006 | Soupliotis | .............. | H04N 7/012 |
| | | | | 348/700 |
| 2006/0282548 A1* | 12/2006 | Yoshida | ................. | G06Q 10/10 |
| | | | | 710/1 |
| 2007/0185959 A1* | 8/2007 | Huck | ................ | H04L 29/08846 |
| | | | | 709/204 |
| 2013/0159858 A1* | 6/2013 | Joffray | ................... | G06F 3/165 |
| | | | | 715/719 |

* cited by examiner

*Fig. 15*

METHOD FOR PARALLEL IMAGE PROCESSING AND ROUTING

PRIORITY CLAIMS

This application is a continuation of U.S. patent application Ser. No. 16/171,210, filed Oct. 25, 2018, which is a continuation of U.S. patent application Ser. No. 15/170,575, filed Jun. 1, 2016, and issued as U.S. Pat. No. 10,142,641 on Nov. 27, 2018, which claims priority from and is a continuation-in-part of U.S. patent application Ser. No. 13/430,489, filed Mar. 26, 2012, which is a continuation-in-part of U.S. patent application Ser. No. 12/776,048, filed May 7, 2010, and issued as U.S. Pat. No. 8,266,333 on Sep. 11, 2012, which claims the benefit of U.S. Provisional Patent Application Ser. Nos. 61/182,624, filed May 29, 2009, and 61/234,577, filed Aug. 17, 2009. Each of the foregoing applications is hereby incorporated by reference.

TECHNICAL FIELD

The present invention relates generally to video and data stream processing, and more particularly, some embodiments relate to simultaneously processing multiple image streams with selectable algorithms in real time.

DESCRIPTION OF THE RELATED ART

Unmanned aerial vehicles (UAVs) are often equipped with a variety of sensors that provide a wide range of imagery and telemetry data to a ground control station. UAVs are operated under a broad range of conditions and are equipped with various sensor systems to allow this operation. For example, a UAV may be equipped with a video camera, an infrared camera, and a synthetic aperture radar system, allowing it to operate under a broad range of conditions. Data from these different sources are typically displayed on different display devices within the ground control station. These data streams are typically transmitted using a variety of protocols and formats according to the source device and purpose of the data stream. Accordingly, a ground control station typically devotes separate resources to the separate data streams.

To display visual information from data streams (e.g., comprising imagery, telemetry, tactical or technology information), large panel video and multi-screen displays are commonly employed in such contexts as Network Operations Centers (NOCs), Tactical Operations Centers (TOCs), Emergency Operations Centers (EOCs), security, entertainment, operating rooms, theaters, industrial design and retail venues. Such displays are often referred to as video walls, info walls, data walls, tiled displays, virtual walls, display walls, or virtual monitor walls. Large panel video and multi-screen displays provide groups of people with visual information that can be automatically updated, or are frequently used for enabling collaboration among viewers. Where a large panel video and multi-screen display is used for group collaboration, there is generally a requirement that the group has the ability to update and reconfigure the visual information displayed, which is usually facilitated through a video switch. Traditional video switches are controlled through a switch box, a keyboard, or a local connection (via an RS-232 port or Ethernet port) and have only a single point for control access.

In some contexts, visual data streams to a single large panel video display or a multi-screen display configuration are provided by two or more computer systems, each being controlled by a computer operator (i.e., user) using such input/output (I/O) devices as keyboards, mice, and as video monitor. At times, it is convenient for the computer operator to share the IO devices between the computers by means of a device that switches the IO devices between the multiple computers. These switches, often referred to as a Keyboard-Video-Mouse (KVM) switch, are commanded by the computer operator (e.g., commanded by a special keyboard sequence or a button on the KVM switch) to switch a common keyboard, mouse, or video monitor between controlling the computer systems.

BRIEF SUMMARY OF THE EMBODIMENTS OF THE INVENTION

The present invention is directed toward a system and method for simultaneously switching multiple input image streams to multiple output devices while providing optional image processing functions on the image streams. The incoming image streams may come from computers, cameras, radar, medical devices, or other image stream generating devices. The incoming streams may vary in resolution, frame rate, format, and protocol according to the characteristics and purpose of their respective source devices. The incoming image streams can be iteratively routed through a reconfigurable array of image processing circuit cards to operate on one or more streams using preprogrammed algorithms. A processed stream can be routed through another processing function, or to an output circuit card that sends the completed image to the external display, recording device, across a network, or to another logical destination.

For example, a system or method in accordance with the present invention may selectively and dynamically route one or more image input streams through one or more dynamically selectable and iterative algorithm processing elements (or modules) before the resulting processed streams are routed to one or more selectable outputs. For some embodiments, dynamic selectability with respect to inputs means that one or more inputs can be selected or unselected in real time for routing to one or more image processing elements. For additional embodiments, dynamic and iterative selectability with respect to processing elements means that a selected image stream can be routed to one or more image processing elements simultaneously and in real time. The routing may be based upon criteria relating to the image stream's source, the image stream's content, or on the processing results of a preceding image processing element. The output of an image processing element may be directed back to the system or method for routing to a subsequent image processing element, or to one or more image outputs that supply an image stream to an output device (e.g., display, image recorder, or other image processor, or transmission device).

An exemplary system for collaboratively switching an image stream input to an image stream output, comprising: an image stream input interface; an image stream output interface; a first image processing module, wherein the first image processing module is configured to accept an image stream from the image stream input interface or another image processing module, apply an image processing function to the image stream, and output a processed image stream; and a switching matrix, wherein the switching matrix is in communication with the image stream input interface, the image stream output interface, and the first image processing module such that the switching matrix can selectively map (i.e., route) the image stream input interface to the image stream output interface or to the first image processing module, and the switching matrix can selectively map the processed image stream from the first image processing module to the image stream output interface or to a second image processing module. An image stream includes both a steady flow of image frames (i.e., video) and image stills captured at a set interval (e.g., once every hour). Additionally, for some embodiments the system comprises a plurality of image processing modules, a plurality of image stream input interfaces, or a plurality of image stream output interfaces. Furthermore, in further embodiments, the system may be integrated into a display having a display output, wherein the image stream output interface is in communication with the display output.

In some embodiments, the image processing module is a field programmable gate array (FPGA) to which algorithms, such as image processing functions, can be programmed and changed if desired. Additionally, with the use of multiple images processing functions, algorithms, such as image processing functions, can be executed in a predetermined or adaptive sequence. Exemplary algorithms include convolutions, real-time adaptive histograms, and algorithms capable of processing multiple frames simultaneously (e.g., image subtraction function).

After reading this description, one of ordinary skill in the art would understand that, depending on the embodiment, either the image stream input interface, the image stream output interface, or both may utilize unidirectional communication or bidirectional communication with input devices and output devices. For example, a system may be configured to receive control information from a controller interface device via an image stream output interface, or to send control information to an image source via an image stream input interface. In another example, the control information is received by the system through the Display Data Channel (DDC). Depending on the embodiment, the system may be configured to send control information to a device external to the system, through the image stream input interface.

In some embodiments, the switching matrix may selectively map an image stream input interface or a processed image stream in real-time. In further embodiments, the switching matrix may selectively map the image stream input interface to more than one image processing module or to more than one image stream output interface simultaneously. Additionally, in some embodiments, the switching matrix may selectively map the processed image stream to more than one image processing module or to more than one image stream output interface simultaneously. In other embodiments, the switching matrix may selectively map an image stream input interface or the processed image stream based on a criterion. For example, the switching matrix may selectively map an image stream input interface or a processed image stream based on its source or content. In another example, the switching matrix may selectively map a processed image stream based on the results of a preceding image processing module. Depending on the embodiment, the image processing module may have the capability of processing a plurality of image streams in parallel.

The image stream interface for some embodiments may be configured to receive the image stream from an image stream capture device, an image stream playback device, a computer system, a sensor device (e.g., sensors typically found on an aircraft, such as a radar system), or a medical device (e.g., endoscope). The image stream output interface for some embodiments may be configured to output to a display (e.g., liquid crystal display monitor), a computer system, or recording device (e.g., digital video recorder). Further, in some embodiments, the system may be configured to output an image stream through a virtual display.

In numerous embodiments, the system further comprises a data input interface, wherein the switching matrix is further in communication with the data input interface such that the switching matrix can further selectively map the data input interface to the image stream output interface or to the first image processing module. For some such embodiments, the image stream input interface may comprise the data input interface.

With respect to protocols and interface types, in various embodiments, the image stream input interface or image stream output interface has a Digital Video Interface (DVI) connector, High-definition Multimedia Interface (HDMI) connector, a Bayonet Neill-Concelman (BNC) connector, a fiber optic connector, a DisplayPort connector, a Universal Serial Bus (USB) connector, or a Firewire (IEEE1394) connector. In regard to formats, the image stream input interface is configured to convert from or the image stream output interface is configured to: a Digital Video Interface (DVI) standard (e.g., DVI-D digital mode, DVI-A analog mode), a High-definition Multimedia Interface (HDMI) compatible standard, a Red-Green-Blue (RGB) Analog standard, a Red-Green-Blue (RGB) Digital standard, a DisplayPort standard, a National Television System Committee (NTSC) standard, a Phase Alternate Line (PAL) standard, or a Serial Digital Interface (SDI) standard.

The image processing function in some embodiments may comprise an image stream mix function, an image stream scale function, an image stream blend function, an image stream encoding algorithm, or an image stream enhancement function. For those embodiments having an image stream enhancement function, the image stream enhancement function may comprise a de-haze function, a de-blur function, a shadow function, a dawn-dusk function, a fusion function, a (motion) stabilization function, a thermal turbulence function, an equalization function, an edge detection function, a rain and fog function, or a light optimizing function. Further, in some embodiments, the system can eliminate or reduce frame latency by configuring an image processing module to apply processing results of a given frame to a subsequent frame.

In additional embodiments, where the image stream is provided by an endoscope, the image processing function can enhance the image stream for detecting texture differences in living tissue, detecting a polyp, detecting anomalous tissue, detect blood circulation, or identifying reference locations for subsequent registration of images from another modality. In further embodiments, a light optimizing function may adjust a color channel for the image stream in order to detect polyps. For example, the system may apply image processing functions in real time to image feeds from an endoscope in order to detect differences in living tissue, detect anomalous tissue, determine boundaries where tissue texture changes (for tissue volume and size information), and identify reference locations for subsequent registration of images from other modalities.

With respect to the last objective for image processing function, image registration is the process of determining the alignment between two images that have overlapping regions, where the images may be acquired at different times and/or by different sensors. The difficulty in aligning such images is further increased during multi-modal image registration, where the images are acquired using different imaging techniques (e.g., two images that share similar content may have very different intensity mappings).

One area where the alignment of images of different modalities (i.e., multi-modal image registration) is important is in the field of medical imaging. Different medical imaging techniques, such as x-rays, computed tomography (CT), magnetic resonance imaging (MRI), and positron emission tomography (PET), reveal different types of information about the body that can be used in the diagnosis of a disease. For example, consider the comparison of a slice from a cranial T1-weighted MRI scan and its corresponding CT scan. The bone structure of the head, for example, will be clearly visible in the CT scan, and indicated by the bright areas in the image. The bone structure has a higher radiodensity than the surrounding tissue. This is not the case for an MRI scan where, unlike the CT scan, tissue differences can be clearly distinguished. Accordingly, the alignment of images of different modalities (e.g., image from a MRI scan and a CT scan) would allow for a better overall picture of a patient's condition. Accordingly, in some embodiments, algorithms such as edge detection, sum of squared differences (SSD) and Fast Fourier Transform (FFT) are programmed into the image processing module such that multi-modal registration of images, such as from multiple medical imaging modalities, can be achieved. Sum of squared differences (SSD) is a common metric used for judging image similarity by a weighted sum of squared differences (SSD) cost function. The evaluation of the SSD cost function can be performed efficiently using the Fast Fourier Transform (FFT) to determine the optimal translation between two images based on pixel intensities.

In some embodiments, the image stream enhancement function performed by the image processing module comprises an auto-focus function capable of adjusting focus of an image stream capture device that is coupled to the image stream input interface and producing the image stream. For example, the auto-focus function may comprise the operations of: performing an edge detection algorithm on the image stream, thereby producing the processed image stream; and generating focus instructions for the image stream capture device based on the processed image stream. In further such embodiments, the operations of the auto-focus function are repeated iteratively until the image stream capture device is in-focus. In other embodiments, the edge enhancement algorithm utilizes a Laplacian convolution.

In certain embodiments, the system further comprises a control interface through which a user may operate or configure the system, among other things (e.g., check status of the system). For some such embodiments, the control interface may comprise a display touch panel having a graphical user interface, a keyboard, or a mouse, which are all examples of human machine interfaces (HMIs). For particular embodiments where the image stream output interface is outputting to a computer system, the control interface may be directly connected to the system and not connected to the computer system.

In some embodiments, the system can detect what type of image stream input interface, image stream output interface, or image processing module is present in the system, and configure the system according to the type. Further, in some embodiments, the system can detect what type of image stream input interface, image stream output interface, or image processing module is present in the system, and configure the control interface according to the type. For example, the system may detect the types of circuit cards present in each card slot of its chassis, self-configure the mix of image input cards, image processing cards, and image output cards detected, and present to the user a visual representation interface according to the mix for the purpose of providing image routing choices. It should be noted that in some embodiments the control interface comprises virtual buttons.

Additional embodiments provide for methods for switching an image stream input to an image stream output. In particular, one such method comprises: receiving an image stream through an image stream input interface; using a switching matrix to selectively map the image stream to: a first image processing module, wherein the first image processing module is configured to accept the image stream from the image stream input interface or another image processing module, apply an image processing function to the image stream, and output a processed image stream, or an image stream output interface. For some such embodiments, if the switching matrix selectively maps the image stream to the first image processing module, the first image processing module may perform the operations of: receiving the image stream from the image stream input interface or another image processing module; applying the image processing function to the image stream; and outputting the processed image stream. Furthermore, for some such embodiments, if the switching matrix selectively maps the image stream to the first image processing module, the switching matrix may selectively map the processed image stream to a second image processing module or to the image stream output interface.

Various embodiments may enable multiple users/viewers to collaboratively control a system or method for switching multiple input image streams to multiple output devices, while providing optional image processing functions on the image streams. The collaborative control may, in real time, to create, remove, reposition, or resize one or more virtual displays being outputted to an output device. Virtual displays may permit a collaborative user/viewer to split-screen, implement a picture-in-picture (PIP) window, and determine image stream source for a virtual display (e.g., to display new information). The collaborative control may allow multiple points of access, whereby multiple collaborative users/viewers can simultaneously access the collaborative control and dynamically update or reconfigure the virtual displays or the image stream being displayed in a virtual display.

Certain embodiments may enable control by a set of computer input devices (e.g., keyboard and mouse) to switch between multiple computer systems using switching systems and methods described herein. Switching the computer input device between the computer systems may be facilitated by following the computer input device cursor instead between virtual displays.

An exemplary system for collaboratively switching an image stream input to an image stream output, comprising: a plurality of image stream input interfaces; an image stream output interface; a switching matrix in communication with the plurality of image stream input interfaces, and the image stream output interface, wherein the switching matrix is configured to selectively map an image stream input interface of the plurality of image stream input interfaces to the image stream output interface; and a collaborative control interface through which two or more users can operate the system, configure the system (e.g., configure a selectively mapping by the switching matrix), or check status of the system, wherein the collaborative control interface is configured to be simultaneously accessed by at least two of the users.

The system for collaboratively switching an image stream input to an image stream output, may comprise: a first image processing module configured to accept an image stream from the image stream input interface of the plurality of image stream input interfaces or another image processing module, apply an image processing function to the image stream, and output a processed image stream; and a second image processing module, wherein the switching matrix is in further communication with the first image processing module and the second image processing module. The switching matrix may be further configured to: selectively map the image stream input interface of the plurality of image stream input interfaces to the image stream output interface or to the first image processing module, and selectively map the processed image stream from the first image processing module to the image stream output interface or to a second image processing module.

The collaborative control interface may comprise a web-based interface that enables operation of the system, configuration of the system, or a status check of the system, and wherein the web-based interface is accessible by the users by way of a network connection with the system (e.g., Ethernet, WiFi, or serial connection). The collaborative control interface may be further configured to receive commands from the users, store the commands into a queue, and perform the commands on the system in accordance with the queue. The commands may relate to operating the system, configuring the system, or checking a status of the system. The system may detect what type of image stream input interface, image stream output interface, or image processing module is present in the system, and configure the collaborative control interface according to the type.

Where at least one of the users is an administrative user and at least one of the users is a non-administrative user, a command from the administrative user through the collaborative control interface may be performed before a command from the non-administrative user. Where at least one of the users is an administrative user and at least one of the users is a non-administrative user, the administrative user may operate the system, configure the system, or check a status of the system through the collaborative control interface at the exclusion of the non-administrative user.

The system may be configured to output an image stream to a virtual display, in a mapped image stream, being outputted to the image stream output interface. Accordingly, configuring the system may include creating the virtual display, closing the virtual display, resizing the virtual display, repositioning the virtual display within the mapped image stream being outputted to the image stream output interface, moving the virtual display to another mapped image stream being outputted to another image stream output interface (e.g., move a virtual display from a display one to a display two), or repositioning the virtual display within the mapped image stream being outputted to another image stream output interface.

For some embodiments, the switching matrix may selectively map two or more image stream input interfaces of the plurality of image stream input interfaces to the image stream output interface simultaneously. Additionally, the switching matrix may selectively map image stream input interface of the plurality of image stream input interfaces to two or more image stream output interfaces simultaneously.

An exemplary method for collaboratively switching an image stream input to an image stream output, comprising: receiving a first command from a first user by way of a collaborative control interface accessible by two or more users simultaneously, wherein the first command relates to configuring a switching matrix in communication with a plurality of image stream input interfaces and an image stream output interface, and wherein the switching matrix is configured to selectively map an image stream input interface of the plurality of image stream input interfaces to the image stream output interface; and receiving a second command from a second user by way of the collaborative control interface, wherein the second command relates to configuring the switching matrix. The method may then store the first command and the second command (e.g., based on time of receipt, command type, user or user type issuing the command), in a queue; and perform the first command and the second command in accordance with the queue, thereby configuring the switching matrix in accordance with the first command and the second command. Subsequently, the method may receive an original image stream from the image stream input interface of the plurality of image stream input interfaces; and using the switching matrix (e.g., as configured by the first and second commands) to selectively map the original image stream to the image stream output interface.

For some embodiments, using the switching matrix to selectively map the original image stream to the image stream output interface may comprise using the switching matrix to selectively map the original image stream to an image processing module, wherein the image processing module is configured to accept the original image stream from the image stream input interface of the plurality of image stream input interfaces, apply an image processing function to the original image stream, and output a processed image stream. Using the switching matrix to selectively map the original image stream to the image stream output interface may further comprise using the switching matrix to selectively map the processed image stream to the image stream output interface or another image processing module.

In various embodiments, storing the first command and the second command in the queue may be based on an order in which the first command and the second command are received, based on a first priority of the first command and a second priority of the second command, or based on a first user type of the first user and a second user type of the second user.

Where the switching matrix outputs the original image stream to a virtual display, in a mapped image stream, being outputted to the image stream output interface, the first command or the second command may include creating the virtual display, closing the virtual display, resizing the virtual display, repositioning the virtual display within the mapped image stream being outputted to the image stream output interface, or moving the virtual display to another mapped image stream being outputted to another image stream output interface.

An exemplary system for switching control between a plurality of computer systems, comprising a plurality of image stream input interfaces, wherein a first image stream input interface of the plurality of image stream input interfaces is configured to couple with a first computer system of the plurality of computer systems, and wherein a second image stream input interface of the plurality of image stream input interfaces is configured to couple with a second computer system of the plurality of computer systems. The system may further comprise a plurality of computer input device interfaces (e.g., Universal Serial Bus [USB], PS/2, AT connector, Bluetooth, Infrared [IF], or FireWire), wherein a first computer input device interface of the general plurality of computer input device interfaces is configured to couple with the first computer system, and wherein a second computer input device interface of the plurality of general computer input device interfaces is configured to couple with the second computer system. The system may additionally comprise: a central computer input device interface (e.g., Universal Serial Bus [USB], PS/2, AT connector, Bluetooth, Infrared [IF], or FireWire); a central image stream output interface; and a switching matrix in communication with the plurality of image stream input interfaces, the plurality of general computer input device interfaces, the central computer input device interface, and the central image stream output interface. The switching matrix may be configured to map the first image stream input interface to a first virtual display being outputted through the central image stream output interface and map the second image stream input interface to a second virtual display being outputted through the central image stream output interface. The switching matrix may be further configured to selectively map the central computer input device interface to the first computer input interface or the second computer input interface based on a location of an input cursor with respect to a first display region being outputted through the central image stream output interface or a second display region being outputted through the central image stream output interface. The first virtual display may be in the first display region, the second virtual display may be the second display region, and the input cursor may be controlled by way of the central computer input device interface.

Selectively mapping the central computer input device interface to the first computer input interface or the second computer input interface may be further based on whether the input cursor is entering or exiting the first display region or the second display region. In some embodiments, the first virtual display may coincide with the first display region, and the second virtual display may coincide with the second display region. Depending on the embodiment, the input cursor may be a mouse being controlled by a mouse coupled to the central computer input device interface or a keyboard cursor being controlled by a keyboard coupled to the central computer input device interface.

An exemplary method for switching control between a plurality of computer systems, comprising: receiving a first image stream at a first image stream input interface configured to couple with a first computer system of the plurality of computer systems; and receiving a second image stream at a second image stream input interface configured to couple with a second computer system of the plurality of computer systems. The method may further comprise: using a switching matrix to map the first image stream from the first image stream input interface to a first virtual display being outputted through a central image stream output interface; and using the switching matrix to map the second image stream from the second image stream input interface to a second virtual display being outputted through the central image stream output interface. The method may additionally comprise receiving input information from a central computer input device interface; and using the switching matrix to selectively map the control information from the central computer input device interface to a first computer input device interface or a second computer input device interface based on a location of an input cursor with respect to a first display region or a second display region. The first display region may be outputted through the central image stream output interface, and the second display region may be outputted through the central image stream output interface. The first computer input device interface may be configured to couple with the first computer system, and the second computer input device interface may be configured to couple with the second computer system. The first virtual display may be in the first display region, the second virtual display may be the second display region, and the input cursor may be controlled by way of the central computer input device interface.

Other embodiments provide for a computer readable storage medium having instructions embedded thereon to cause a processor to perform operations similar to those described above with respect to the various systems and methods in accordance with the present invention.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 15 illustrates an exemplary control interface for switching control between a plurality of computer systems according to an embodiment of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Figure 1A:
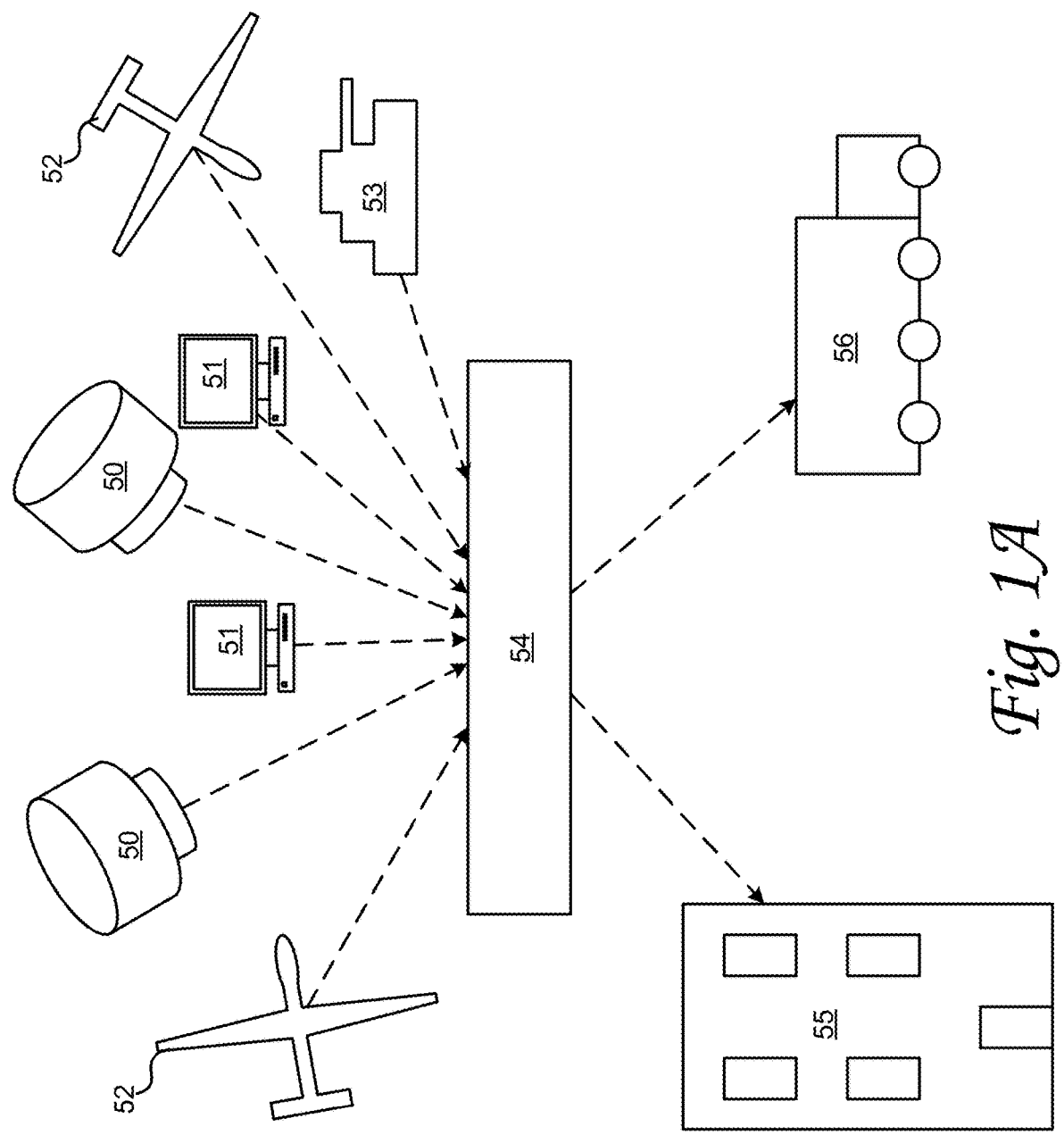
FIG. 1A illustrates an exemplary environment in which an embodiment of the invention might be employed.

Before describing the invention in detail, it is useful to describe an exemplary environment with which the invention can be implemented. One such example is that of a military operation, an example of which is shown in FIG. 1A. Video feeds and other data are processed and relayed by a system 54 to one or more destinations 55 and 56. For example, the video feeds and other data may comprise satellite imagery feeds transmitted by satellite 50; airborne sources of information such as live video or radar feeds from aircraft, such as unmanned aerial vehicles (UAVs) 52 or a manned surveillance aircraft (not shown); ground-based information, such as imagery from ground vehicle 53; or any other video or data feed, such as prerecorded video of terrain stored in computers 51 for use in providing contextual information for a live video stream. In this environment, the data from the various data sources are combined in system 54 and relayed to destinations 55 and 56. For example, destination 55 might comprise a headquarters that is overseeing the military operation and destination 56 may comprise a mobile operations center in charge of coordinating the operation or a portion of the operation. For example, mobile operations center 56 may comprise a UAV operations center charged with piloting the UAVs 52. In many implementations, destinations 55 and 56 may contain a plurality of different devices to receive incoming data, such as multiple displays, storage devices, or satellite transmitters. Moreover, various personnel may desire access to all or a portion of the available data. Accordingly, system 54 may be configured to selectively transmit different portions of the data to the various displays according to the needs of the personnel.

Figure 1B:
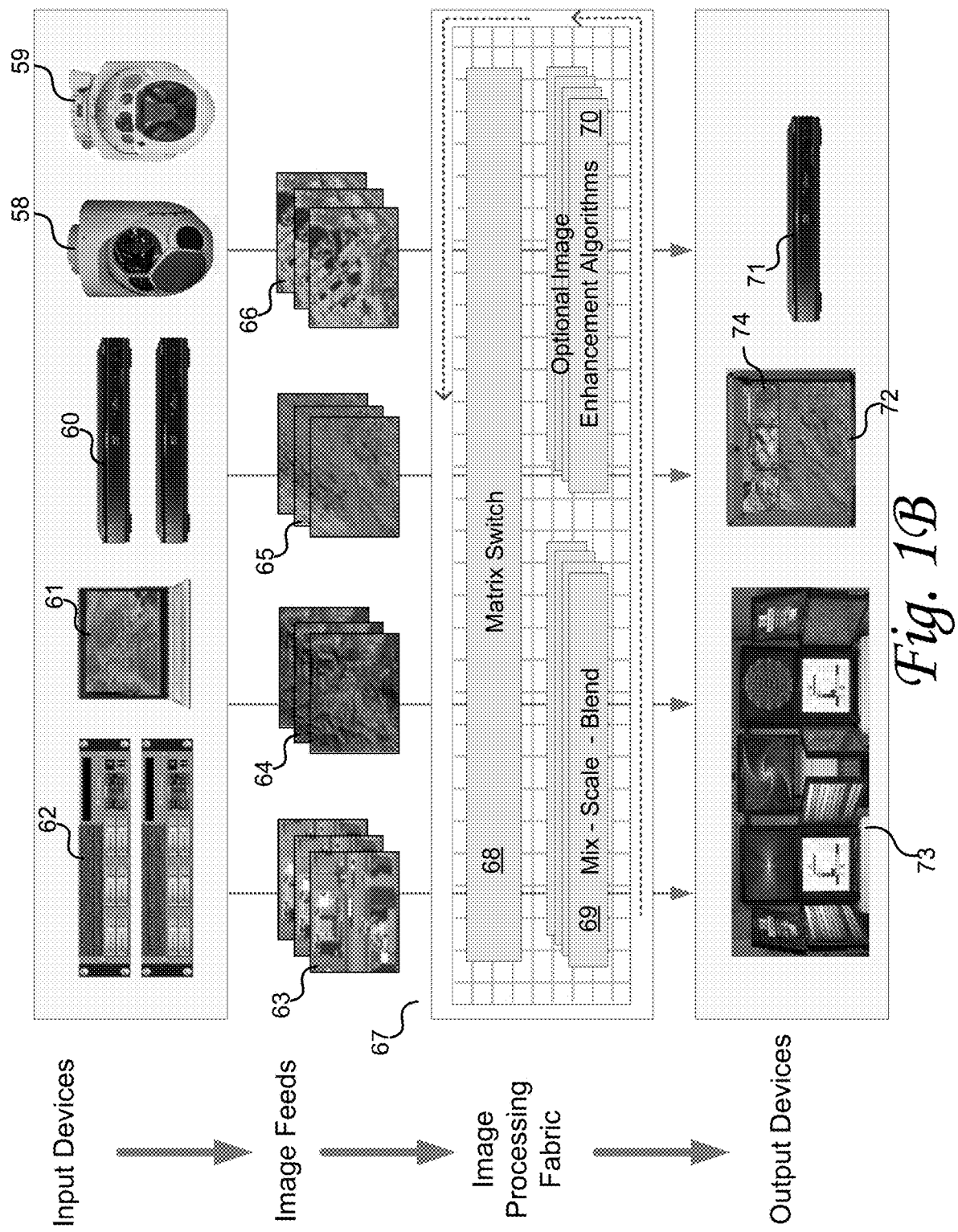
FIG. 1B illustrates an exemplary system process of an embodiment of the invention.

FIG. 1B illustrates an exemplary system process of an embodiment of the invention deployed in the environment of FIG. 1A. A plurality of input devices, such as computers 62 and 61, storage devices 60, and sensor devices 58 and 59 transmit a corresponding plurality of image feeds to the system 67. For example, the image feeds might comprise satellite imagery 63, high-altitude terrain imagery 64, pre-recorded terrain imagery 65, or an infrared video feed 66. The image feeds are then transmitted to the system 67 for processing and routing to a variety of output devices. A matrix switch 68 allows the image feeds to be directly routed to the output devices or to be routed through one or more image processing or other functional modules. For example, a system might comprise a dedicated subsystem of image processing modules 69 to perform mixing, scaling, blending functions, and image enhancement functions. In some embodiments, the most common image processing functions may be performed on a dedicated subsystem 69. In the embodiment illustrated in FIG. 1B, these are mixing multiple image streams together, for example to create a virtual display 74; scaling image streams, for example interpolating an image to increase image resolution for comfortable viewing on a larger screen; and blending image streams, for example to overlay one image stream on top of another. In these embodiments, configurable or interchangeable functions may be performed on a second subsystem 70. Such functions might comprise image enhancement functions as image stabilization, image de-blurring, image de-hazing, dawn/dusk compensation, temporal blending, image or sensor fusion algorithms, or edge detection, or such functions as video encoding or compression algorithms such as an H.264 encoding algorithm. The processed image streams may be routed to an output device, or rerouted through another functional module. For example, a composite image stream could be formed by performing a sensor fusion algorithm on an infrared video stream and an optical video stream, then the composite image stream could be routed through an encoding module to form an encoded composite of image streams for storage on a video storage device. A variety of different output devices may be used with embodiments of the invention, such as video displays 73, virtual display 74 comprising one or more mixed or overlaid image streams, or video storage device 71.

Further image enhancement functions can also include an auto-focus function configured to adjust the focus of an input device coupled to the system 67 based on the image feed provided by the input device. For example, according to one embodiment, the auto-focus function within an image processing module 69 could adjust the focus of an input device by first receiving an image feed from the input device, performing an edge detection algorithm on the image feed, and then producing a processed image feed that would enable easier detection of an edge. Next, based on the processed image feed, the auto-focus function would generate a focus instruction for the input device. Once the focus instructions have been implemented by the input device, the process may iteratively repeat until the input device comes into focus. In other words, the new image feed provided by the now adjusted input device would be provided to the auto-focus function, the auto-focus function would perform edge detection on the new image feed, and the auto-focus function would, if necessary, generate additional focus instructions for the input device to implement based on the new processed image feed. Optionally, the auto-focus function may utilize a Laplacian convolution in its edge detection algorithm.

From time-to-time, the present invention is described herein in terms of this exemplary environment. Description in terms of this environment is provided to allow the various features and embodiments of the invention to be portrayed in the context of an exemplary application. After reading this description, it will become apparent to one of ordinary skill in the art how the invention can be implemented in different and alternative environments.

Figure 2A:
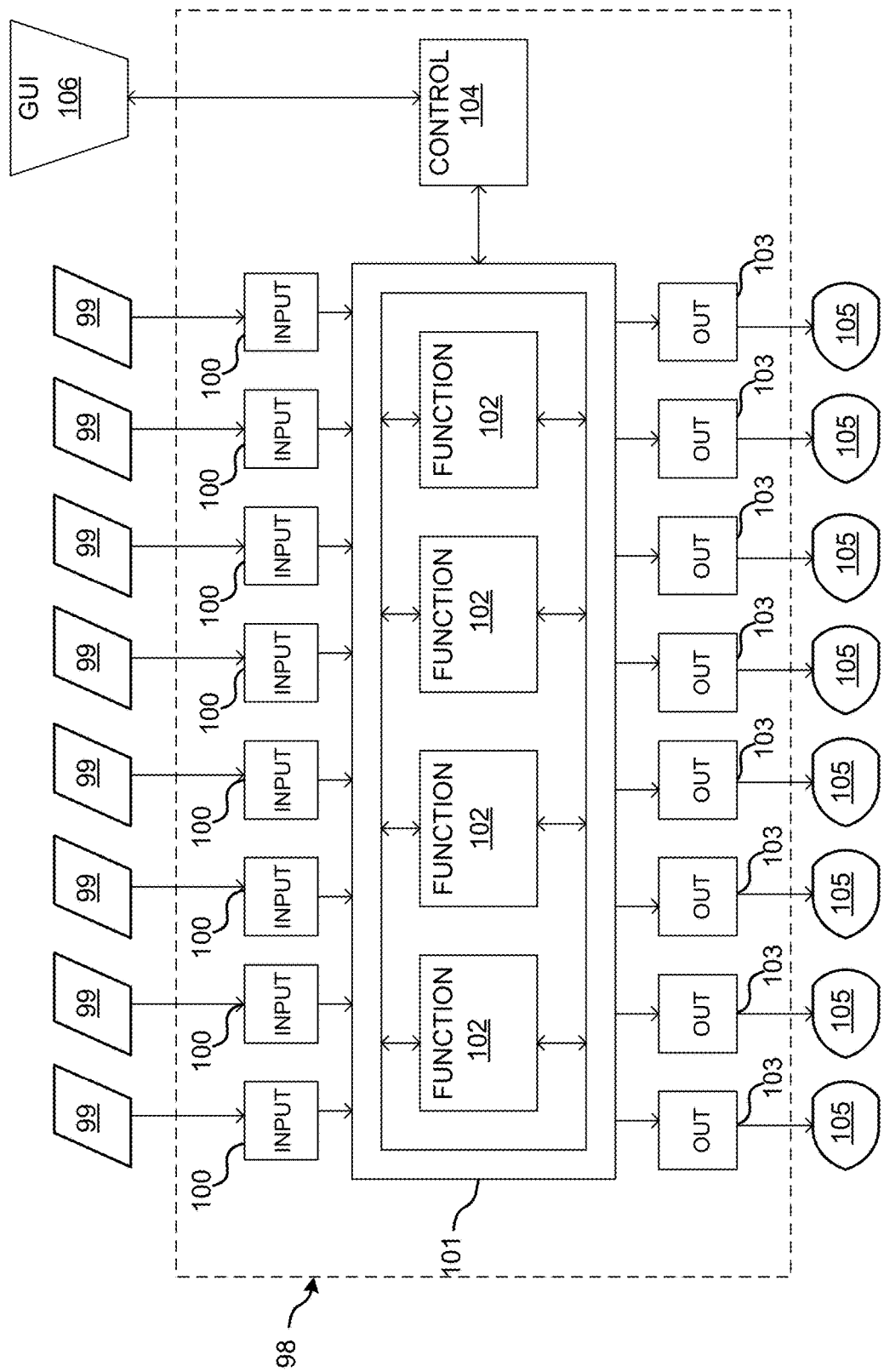
FIG. 2A illustrates an exemplary configurable system for simultaneously processing multiple data streams according to an embodiment of the invention.

FIG. 2A illustrates an exemplary configurable system for simultaneously processing multiple data streams according to an embodiment of the invention. A plurality of data sources 99 are coupled to the system 98 by way of a plurality of input modules 100. The plurality of data sources 99 transmit a corresponding plurality of data streams to the system 98. Depending on the type of data source, these data streams may vary in resolution, frame rate, format, and protocol. For example, a helmet mounted camera may transmit a low resolution and low frame rate image stream to the system 98 that is both compressed and encoded; a UAV-mounted camera may provide an encoded high resolution and high frame rate image stream; and a computer may provide a static or slowly varying chroma mask for inserting information into a displayed image stream. Accordingly, in this embodiment, the input modules 100 are configured to receive these different data streams and convert them to a common format for use in system 98. For example, inputs 100 may convert the image streams to an uncompressed 30 frames per second video feed comprising four differential signals (red, green, blue, and clock signals) according to the Digital Video Interface (DVI) standard.

In additional embodiments, inputs 100 may convert the images streams to other standards, such as a High-definition Multimedia Interface (HDMI) standard, a Red-Green-Blue (RGB) Digital standard, a Red-Green-Blue (RGB) Analog standard, a DisplayPort standard, a National Television System Committee (NTSC) standard, a Phase Alternate Line (PAL) standard, Serial Digital Interface (SDI) standard. Accordingly, various embodiments may have inputs 100 further configured with a variety of connector types, thereby enabling system 98 to accept image streams based on different protocols, formats, and standards. For example, some of those connector types include Digital Video Interface (DVI), High-definition Multimedia Interface (HDMI), Bayonet Neill-Concelman (BNC), fiber optic, DisplayPort, Universal Serial Bus (USB), and Firewire (IEEE1394).

Continuing with the illustrated embodiment, input modules 100 are coupled to a switch fabric 101 that allows the converted image streams to be routed to any of the output modules 103 or function modules 102. For example, switch fabric 101 may comprise a crossbar switch or crossover switch matrix. The embodiment further comprises a control module 104 in communication with a graphical user interface (GUI) 106 and the switch fabric 101. In this embodiment, the control module 104 is in electrical communication with the switch fabric 101 to allow the routing configuration of the switch fabric 101 to be controlled. The GUI 106 interfaces with the control module 104 to allow the system user to control which image streams are subject to which image processing functions and where those image streams are eventually displayed. For example, the GUI 106 might comprise a touch screen interface displaying a graphical representation of the system that is configured to allow a user to control the image stream routing and processing through tactile commands. In this example, the control module 104 may interface with the GUI 106 and translate the graphical manipulations performed at the GUI 106 to the corresponding electrical signals necessary to reconfigure the switch fabric 101 to conform to the user's desired routing and processing configuration.

In this embodiment, the switch fabric 101 is in further communication with a plurality of functional image processing modules 102 and a plurality of output modules 103. A functional image processing module 102 is configured to receive one or more image streams via the switch fabric 101, to perform a predetermined function on the received image streams, and output the results as one or more image streams back into the switch fabric 101. In some embodiments, the output of the image processing modules 102 is configured to be compatible with the output of input modules 100. Accordingly, image streams that are output from a first function 102 can be utilized as input streams for a second function 102, and so on. For example, live video from a UAV can be combined with a synthetic aperture radar (SAR) data stream for use in de-hazing the live video stream and a de-hazed live video stream may be provided to an edge detecting functional module to provide a de-hazed and edge detected video stream to a display 105.

Output modules 103 are configured to receive the data streams from the switch fabric 101 and to format them for display on a plurality of display devices 105. For example, one of the output modules 103 may receive an uncompressed video stream from the switch fabric 101 and format it to be compressed and encoded for transmission to a display device 105 situated in a remotely located headquarters. As another example, the GUI 106 may be integrated into one or more of the display devices 105 such that use of the control module 104 comprises manipulating an image displayed on the display device 105 to perform sensor fusion. For example, a user may use a touch display to drag an infrared video stream onto a SAR data stream combining the infrared video stream with the SAR data stream through a sensor fusion algorithm. The GUI 106 then causes the control module 104 to route the infrared video stream and the SAR data stream onto a fusion functional module 102 to display a combined infrared/SAR video stream on the display device 105.

It should be noted that, in addition to military applications, the various systems and methods in accordance with the present invention are also particularly useful in the medical field. Specifically, various embodiments of the invention can be utilized with medical imaging devices, where image streams provided by medical imaging devices can be processed or enhanced for analysis purposes. For example, an endoscope may be used in conjunction with a system in accordance with one embodiment, whereby the system receives an image stream from the endoscope, the system maps the image stream to an image processing module that applies light optimizing functions to the image stream, and the system outputs the results from the image processing module to an output module for display. By doing so, the image stream from the endoscope is enhanced for polyp detection. The light optimizing function may adjust a specific color channel (e.g., red, green, blue) for the image stream, or may adjust the color within a predetermined wavelength range for the image stream (e.g., a predetermined range centered around 10% of the center wavelength). In some embodiments, a graphical user interface may be displayed on the output device in conjunction with the output image stream to enable a system user to modify various parameters of the image processing module. For instance, a user may be able to select a color channel for the displayed image stream and be able to modify the color channel according to user preferences. For example, a user may desire to modify a red channel of the color stream to increase the red channel contrast and modify the red channel tint.

Figure 2B:
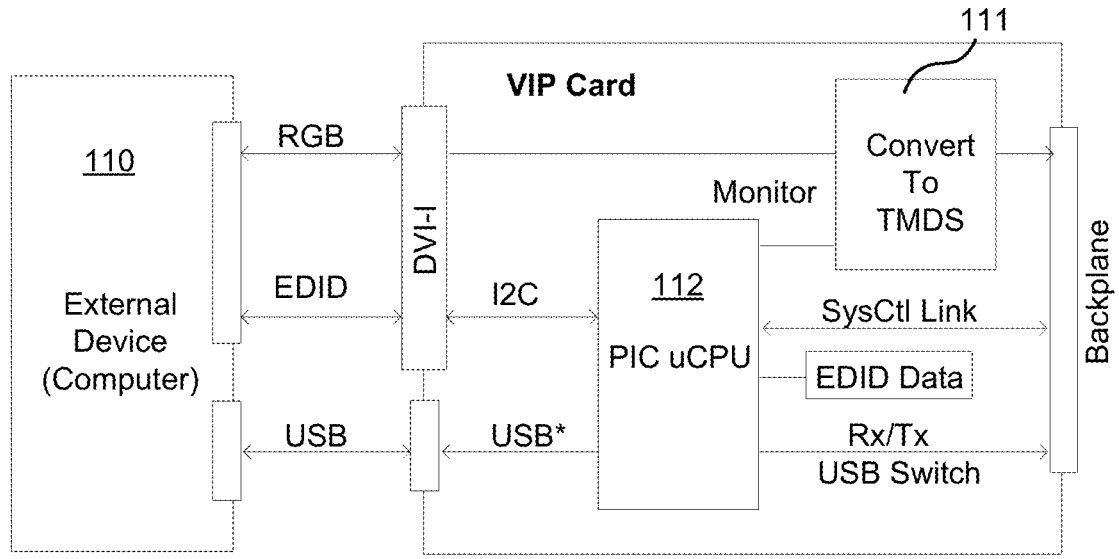
FIG. 2B illustrates an exemplary video input module according to an embodiment of the invention.

FIG. 2B illustrates an exemplary video input module according to an embodiment of the invention. As described herein, data sources used in various embodiments of the invention may be configured using different protocols and formats. For example, an external device 110, such as a computer, may be configured to wirelessly receive and decode radio transmitted video signals and provide them in an analog format according to the DVI-I protocol. The analog signal is transmitted to the conversion module 111 for conversion to a digital standard, such as TMDS. The digitally converted signal is then provided to the switch fabric 101, as described herein. A control module 112 is provided to implement system control functions. For example, the control module 112 may be configured to monitor the conversion module 111 for reporting to the system wide control module, such as module 104 described with respect to FIG. 2A. The control module 112 may be further configured to interface with the external devices, for example through a digital data control channel or a USB interface. For example, some data sources may be devices that are controllable, such as a remote sensor configured to controllably alter its field of view. Accordingly, in addition to receiving data from them, some embodiments may be equipped with the ability to transfer commands and information to the data sources.

Figure 2C:
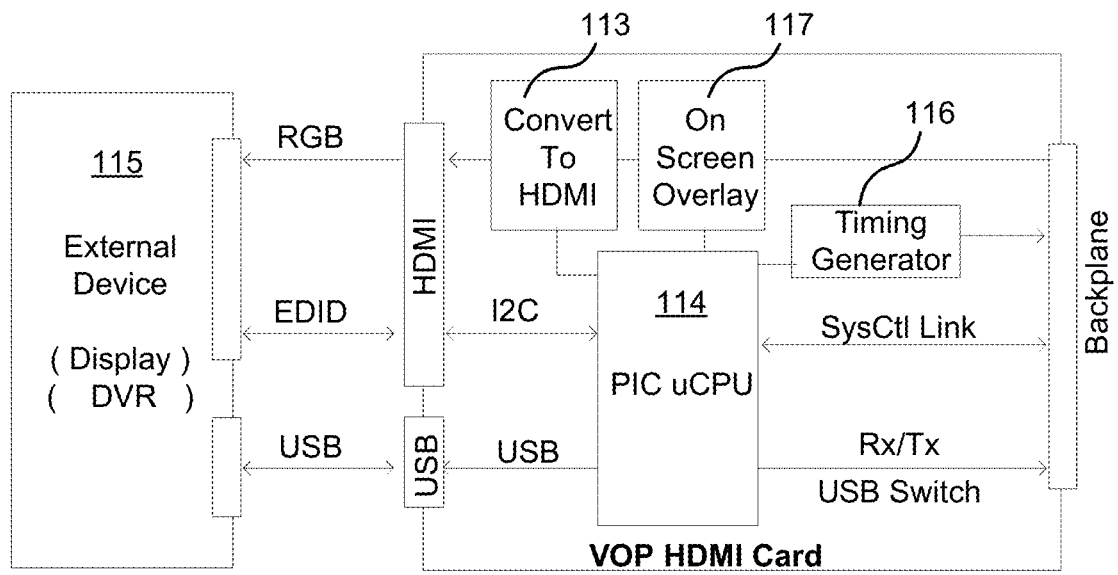
FIG. 2C illustrates an exemplary video output module according to an embodiment of the invention.

FIG. 2C illustrates a video output module according to an embodiment of the invention. As with the input devices, a variety of output devices may interface with the system according to various embodiments of the invention. For example, output devices may comprise radio transmission links, video displays, or recording devices. Accordingly, to interface with these various output devices, a video output module may comprise a conversion module 113 configured to convert the signal received from the switch fabric 101 to an appropriate format for the particular output device 115 coupled to the video output module. A video output control module 114 may also be provided to implement various other functions. For example, control module 114 may monitor the conversion module 113 for reporting to the system wide control module. The control module 114 may also receive display ID information from the external device 115 and provide that information to the system wide control module. In some embodiments, the output device 115 may have particular timing requirements, so the video output module may be further provided with a timing generator module 116 that provides the timing channel for the DVI-D link under the immediate control of the control module 114 and under general control by the system wide control module. For example, timing generator module 116 may generate a timing channel and provide it to a blending and mixing functional module 102 so that multiple asynchronous image streams may be synchronized for image combination and display on output device 115. Additionally, in systems configured to receive information from output devices, the control module 114 may be configured to relay that information to the system. For example, some embodiments may utilize a USB 2.0 communications protocol to allow the output device 115 to transmit data and control information to other devices in communication with the system. In a particular embodiment, some of the other devices in communication with the system are configured for full duplex communications, so to implement USB-based communications, the control module 114 converts the half-duplex USB 2.0 to a full duplex.

Figure 2D:
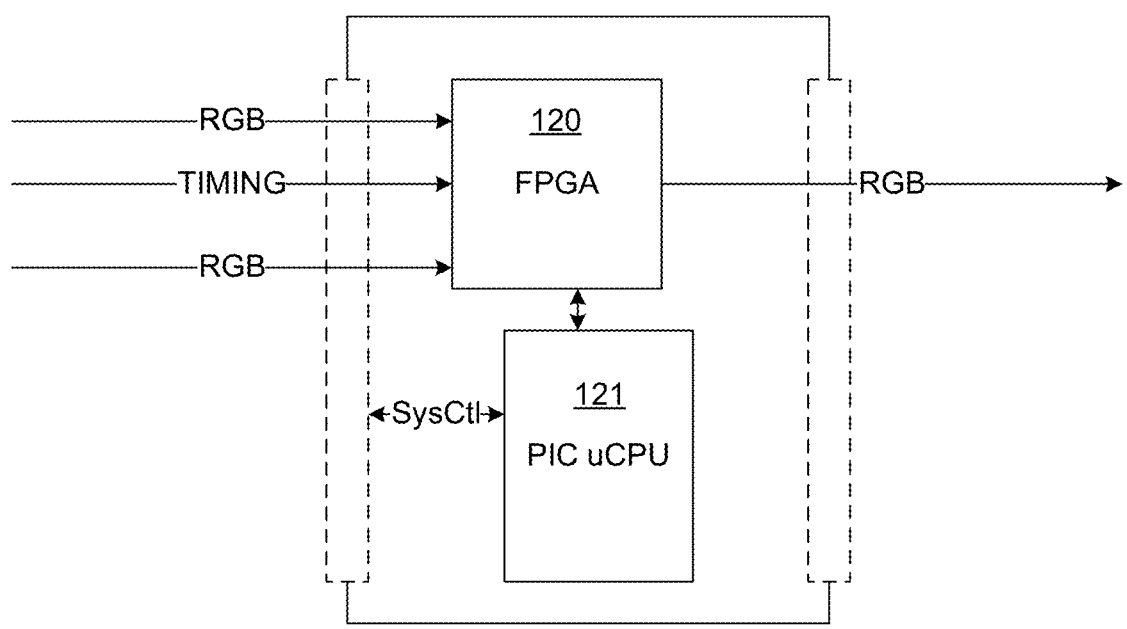
FIG. 2D illustrates an exemplary functional image processing module according to an embodiment of the invention.

FIG. 2D illustrates an exemplary functional image processing module according to an embodiment of the invention. A function module 120 is provided to receive one or more input video streams from the switch fabric 101 and to perform image processing algorithms upon them. The processed video streams are output back onto the switch fabric 101 for use as an input in another function module or transmission to an output device. Additionally, a timing signal, for example as generated by a video output module described with respect to FIG. 2C, may be received by the function module 120 for synchronization and timing formatting. For example, such a timing signal may be used for chromakey-based mixing of two incoming video signals. A control module 121 is further provided to implement system control functions. For example, the control module 121 may be configured to monitor the operations of the function module 120 for reporting to the system wide control module. In some embodiments, the function module 120 may be configured to implement one of a plurality of image processing algorithms, and the choice of algorithm may be controlled by the control module 121 under command from the system wide control. Additionally, some function modules may be configured to download and receive new image processing algorithms. These new algorithms may be transmitted through the system control link and programmed into the function module 120 by the control module 121.

Figure 2E:
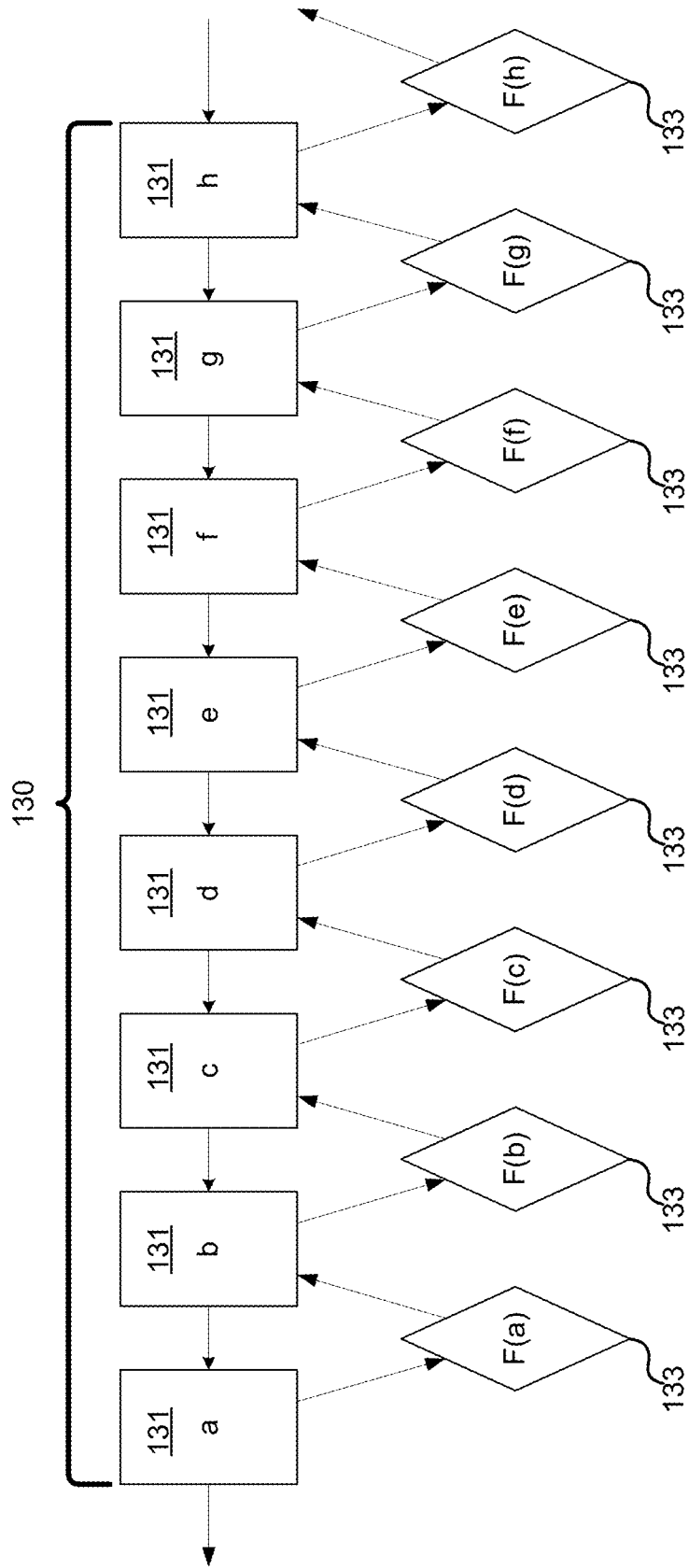
FIG. 2E illustrates an exemplary method of image processing performed by a functional image processing module according to an embodiment of the invention.

FIG. 2E illustrates a general method for image processing according to an embodiment of the invention. Image stream 130 comprises a plurality of frames 131 transmitted at particular time intervals, such as 30 frames per second. In many cases, image stream 130 is unlikely to vary considerably from frame to frame, i.e. frame b is likely to be very similar to frame a, frame c will likely be very similar to frame b, and so on. Accordingly, latency may be avoided or reduced by applying the results of a processing function on a given frame to a subsequent frame. For example, in FIG. 2E, the function 133 is computed for each frame and the results are applied to the next frame, i.e. F(a), the results of the function applied to frame a, are applied to frame b; F(b) is applied to frame c, and so on. In some embodiments, this method may be employed when the time it takes function module 120 to process a single image frame may be less than or equal to the time that image frame is displayed. In other embodiments, the results of a function performed on a frame may be applied to a plurality of following frames, or a frame that follows after a number of intervening frames. For example, the results of the function might be applied to the following three frames and the results function itself may be computed for every third frame. This method might be employed, for example, when computational requirements are larger and frame computations cannot be performed in parallel. As another example, the function may be computed for each frame as before, but the results of the computation might be applied to the fourth frame following the argument of the function. In other words, F(a) may be applied to frame d, F(b) may be applied to frame e, and so on. This method might be employed, for example, when computational time is longer than the time it takes each frame to be displayed but simultaneous frame computations may be performed. In other embodiments, these methods may be combined or implemented together and some latency may be tolerated according to environment-specific variables such as the image stream rate of change, the image stream frame rate, and the image processing function or functions being performed on the image stream.

Figure 3A:
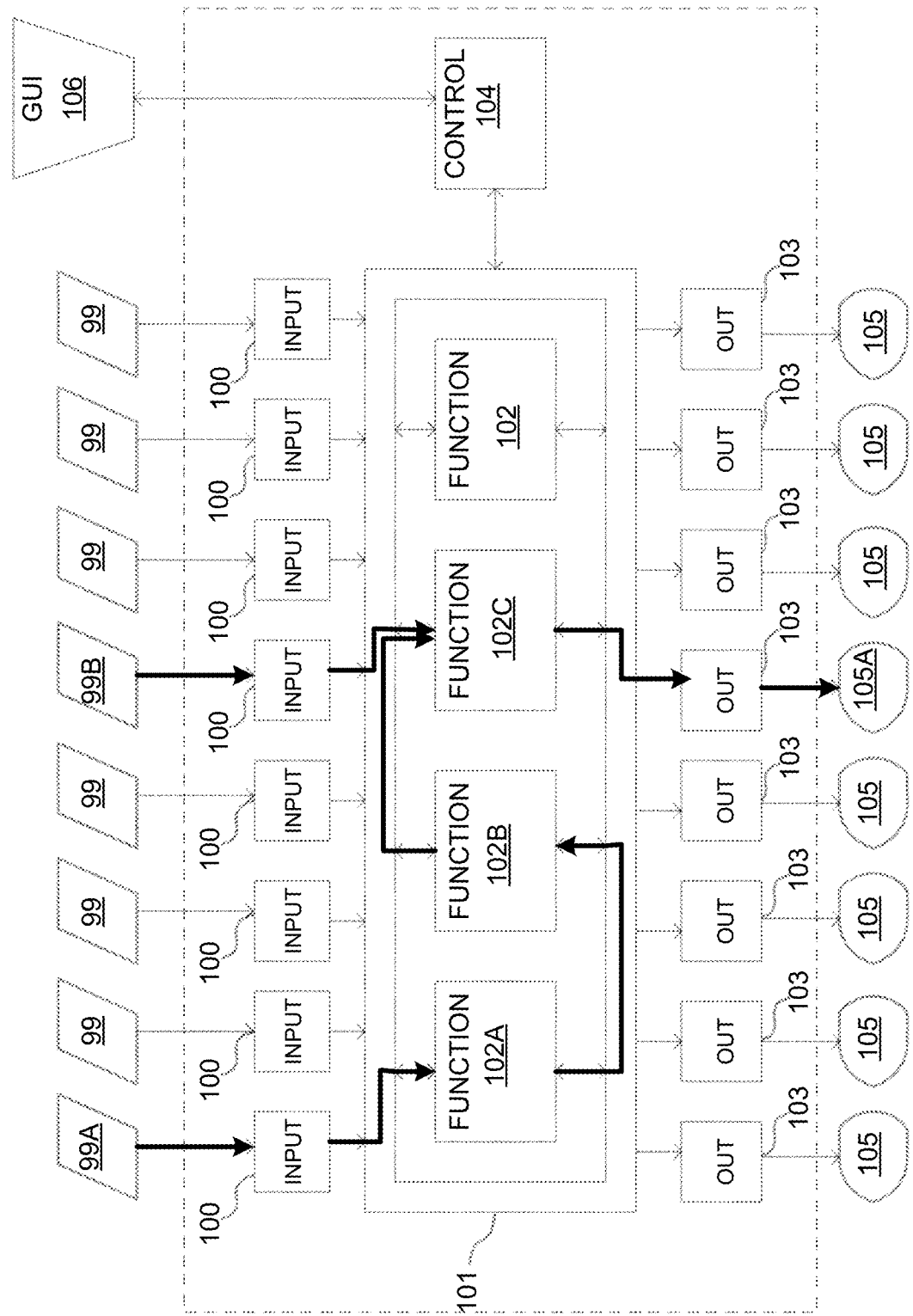
FIG. 3A illustrates an example of iterative image processing according to an embodiment of the invention.
Figure 3B:
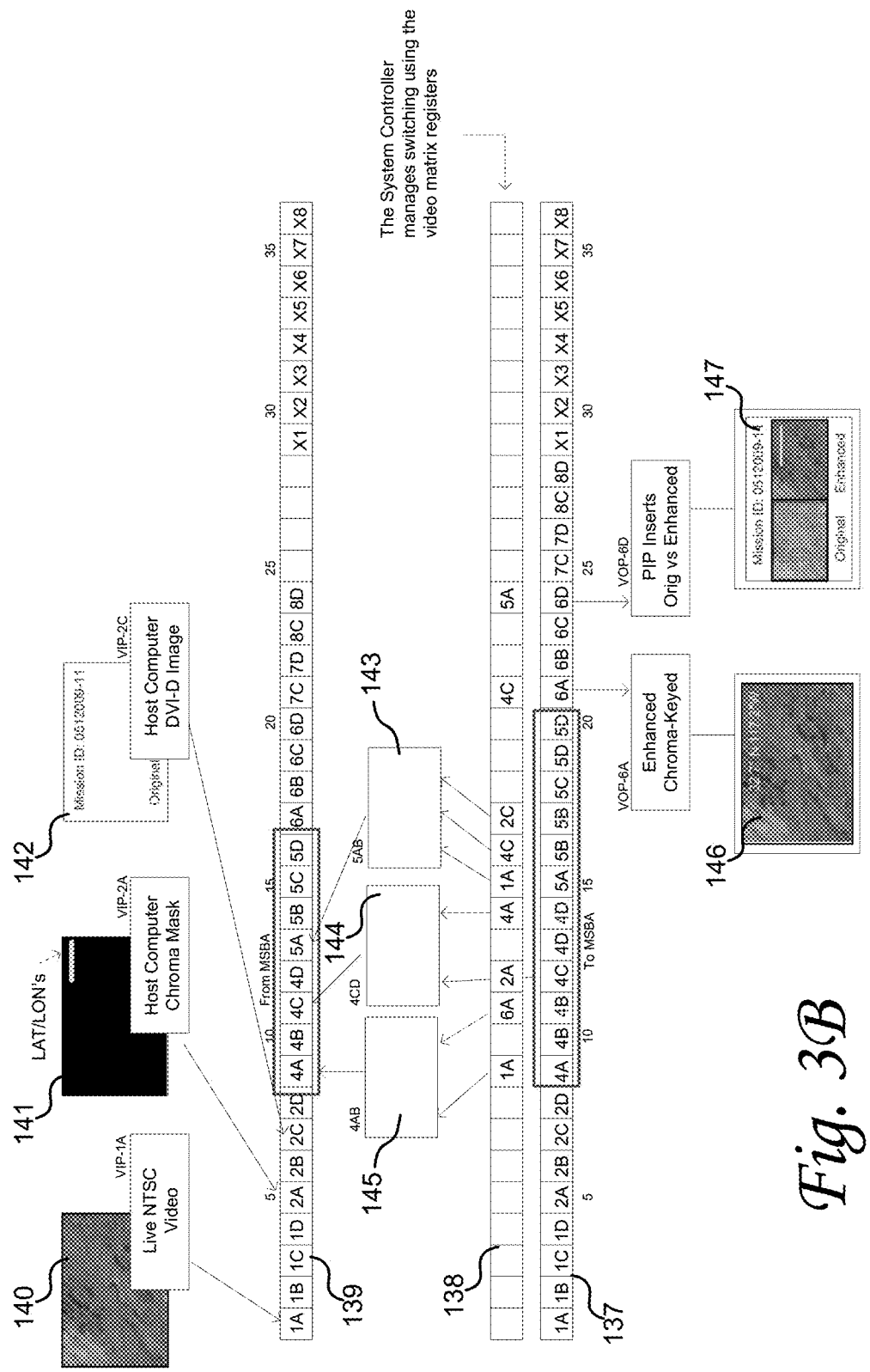
FIG. 3B illustrates an exemplary switch fabric implementation of iterative image processing according to a particular embodiment of the invention.

FIG. 3A illustrates an example of a routing process, where the data stream from data source 99A is routed through functional modules 102A, 102B, and 102C in that order, and then combined with the data stream from data source 99B to be displayed on display device 105A. FIG. 3B illustrates another example of a routing process, implemented on a fabric matrix switch in a system where image streams comprise four differential signal pairs, such as TMDS standard signals. In this example, the fabric matrix switch card may comprise a switch fabric having 144 addressable inputs (input interfaces) and 144 addressable outputs (output interfaces). The inputs and outputs may be further portioned into 36 addressed input ports and 36 addressed output ports, each port comprising four inputs or outputs corresponding to the four differential signal pairs of the image streams. In FIG. 3B, array 139 represents the addressed input ports, array 137 represents the addressed output ports, and array 138 represents the mappings from the input ports to the output ports.

In this example, an analog video feed 140 is converted to a digital standard and provided to the system on input port 1A. Chroma mask 141 comprising latitude and longitude coordinates is provided to the system on input port 2A. A mission ID image is further provided to the system on input port 2C. Port 1A is mapped to output ports 4A and 5A. Output port 4A outputs to module functional 145, which enhances the received feed 140 and provides the enhanced feed to input port 4A. Input port 4A is mapped to output port 4D, which outputs to functional module 144. Input port 2A is mapped to output port 4C, which also outputs functional module 144. Accordingly, functional module 144 applies chroma key image combination to the enhanced feed and the chroma mask to provide an enhanced and coordinate-overlaid feed to input port 4C. Input port 4C is mapped to both output port 6A and output port 5B. Output port 6A is coupled to a video screen 146, so that the enhanced and coordinate-overlaid feed is displayed on a video screen 146. Output port 5B is coupled to functional module 143 along with output port 5A and a second instance of output port 5B. Functional module 143 is configured to scale and combine the received image streams and overlay the mission ID 142 to form an image stream comprising the original analog video stream 140 in a reduced scale alongside the enhanced and coordinate-overlaid image stream, with the mission ID displayed near the top of the images. This mixed stream is provided to input port 5A, which is mapped to output port 6D and displayed on video screen 147.

Figure 3C:
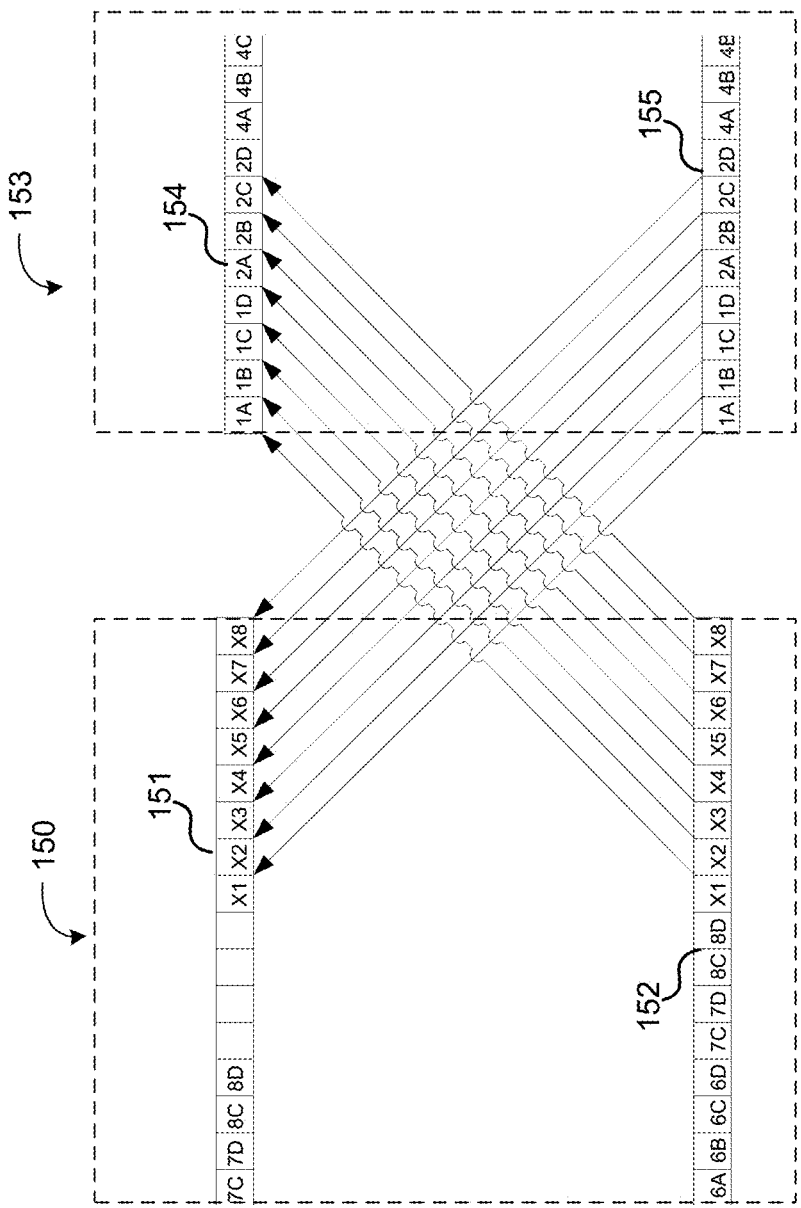
FIG. 3C illustrates an exemplary method of coupling switch fabrics according to an embodiment of the invention.

FIG. 3C illustrates an exemplary method for switch fabrics according to an embodiment of the invention. A portion of a first switch fabric 150 is illustrated with input array portion 151 and output array portion 152, and a portion of a second switch fabric 153 is illustrated with input array portion 154 and output array portion 155. By electrically coupling the output portions of the switch fabrics in the manner illustrated, the two switch fabrics may be combined such that an input device coupled to an input port of array portion 151 can be routed to an output of array portion 155. For example, input port 8D of array 151 might be mapped to output port X1 of array 152 which is in turn mapped to input port 1A of array 154. Input port 1A of array 154 may then be mapped to any of the output ports of array 155. In some embodiments of the invention, such fabric coupling may be employed to achieve a required number of input or output ports. In other embodiments of the invention, this method of fabric coupling may be extended arbitrarily, thereby allowing multiple embodiments of the invention to be coupled together to allow system scaling.

In further embodiments of the invention, the fabric coupling may be configured redundantly to enable failover operation. In yet further embodiments, the switching fabric is capable of supporting a variety of standard protocols in addition to video including, but in no way limited to, Ethernet, Serial Attached SCSI (SAS), Serial ATA (SATA), and PCI Express (PCI-E).

FIGS. 4-8 illustrate a process of configuring an embodiment of the invention for use in the ground station component of a UAV system. In this embodiment, a UAV ground station is equipped with a plurality of monitors, control systems, and communication devices to allow a number of personnel to operate one or more UAVs.

Figure 4:
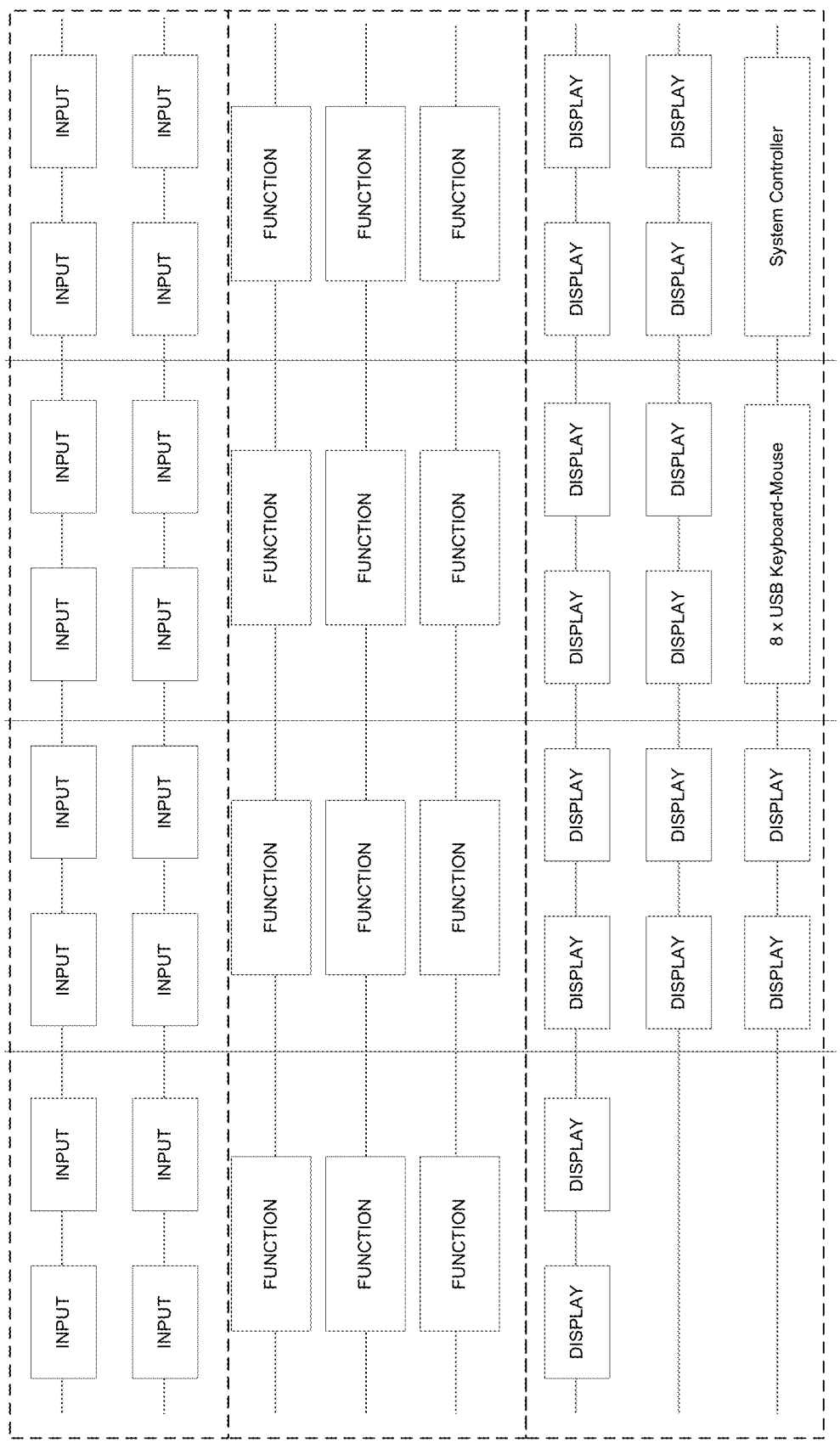
FIG. 4 illustrates an exemplary initial view of a GUI of a non-configured system according to an embodiment of the invention.
Figure 5:
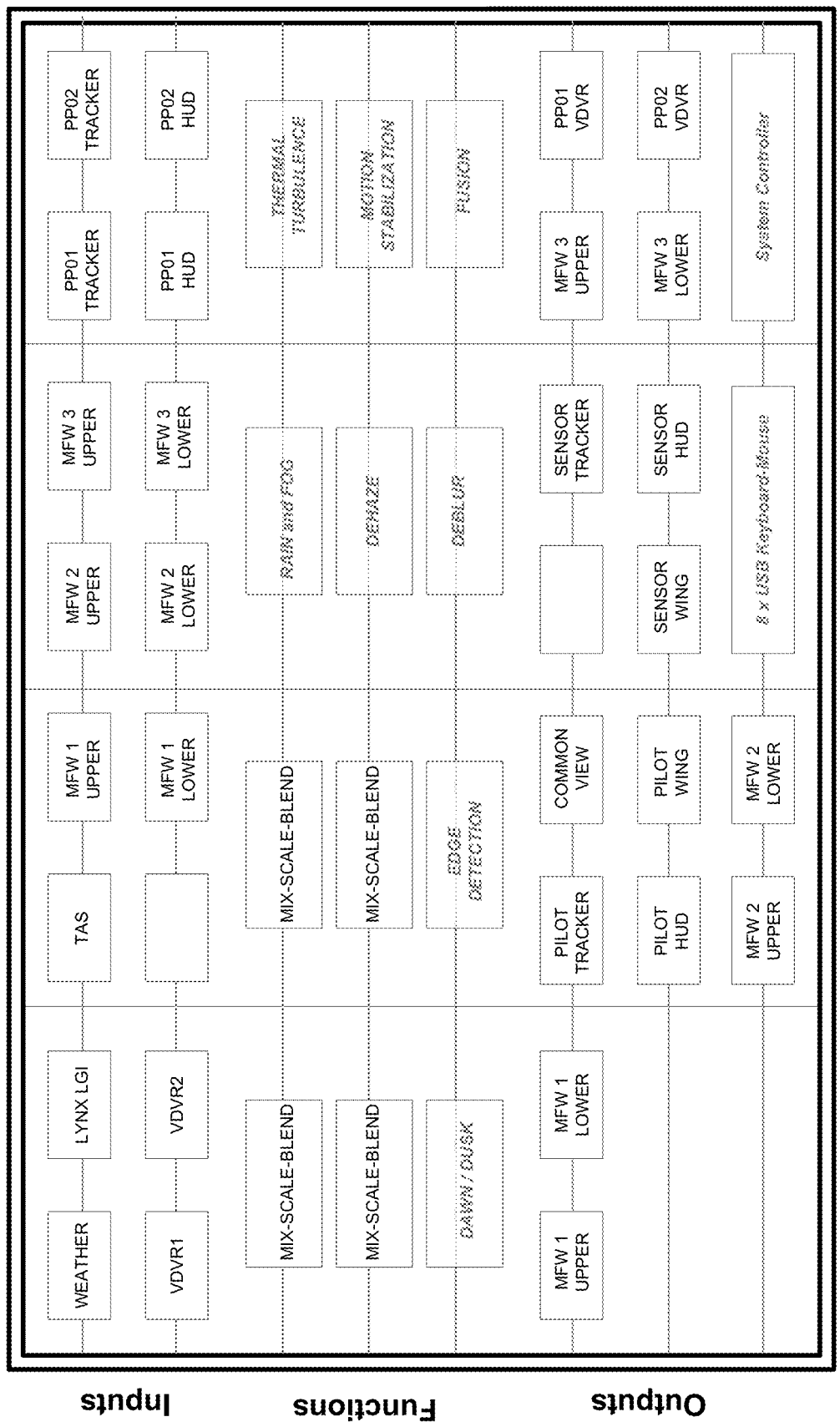
FIG. 5 illustrates an exemplary first step of the configuration of a system according to an embodiment of the invention.
Figure 6:
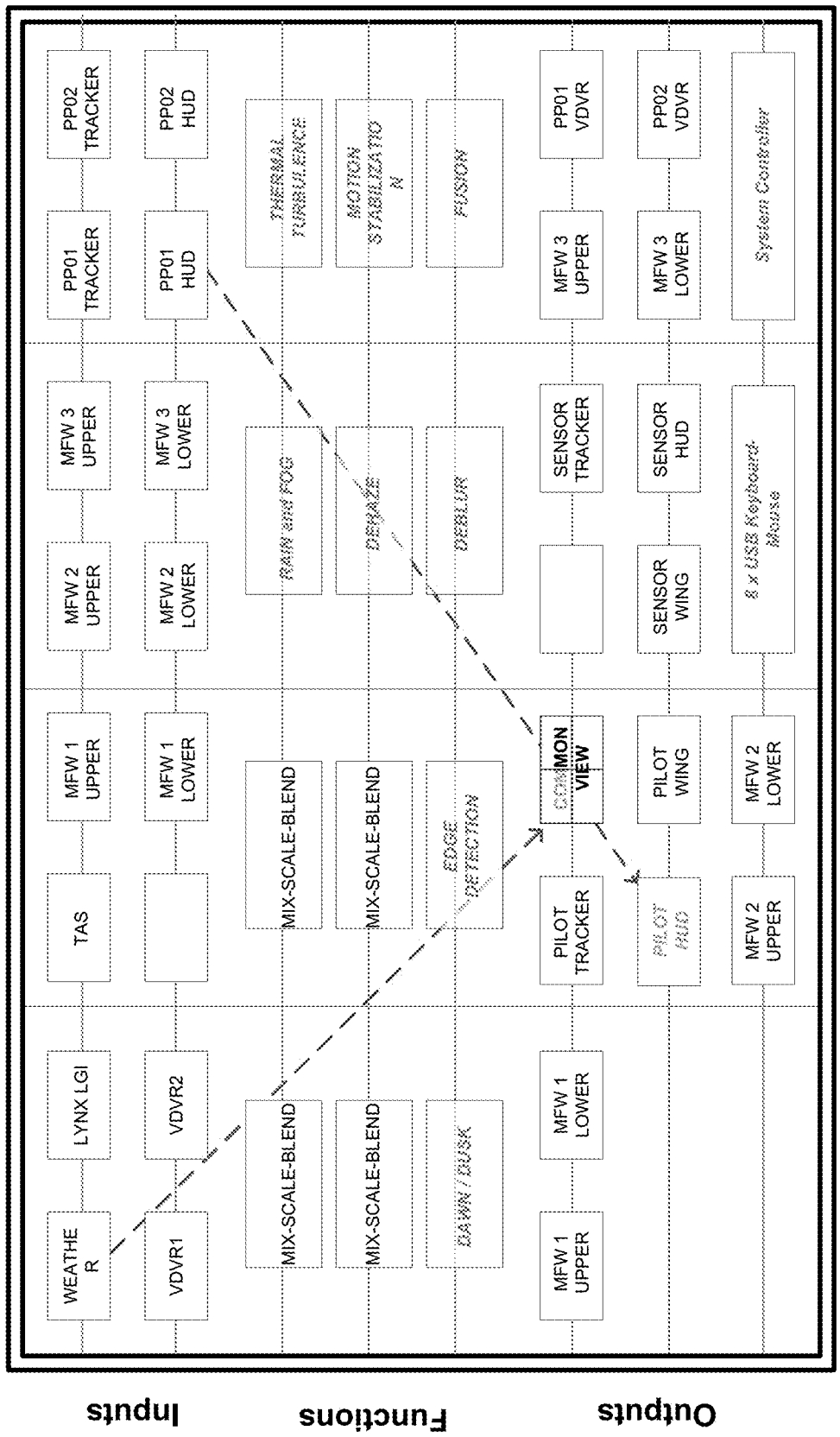
FIG. 6 illustrates an exemplary second step of the configuration of a system according to an embodiment of the invention.

FIG. 4 illustrates an exemplary initial view of a GUI of a non-configured system for installation in a UAV ground station. As illustrated by FIG. 5, configuration begins by labeling the sources and destinations for the input modules and output modules, respectively, and determining the specific functions of the function modules. Next, as illustrated by FIG. 6, the destinations for the input data streams are determined. For example, a weather data stream, such as provided by a weather station or other data source, is configured to be displayed in a common view display device; and the output of the heads-up display of a pilot payload operator station is configured to be displayed on the pilot's heads-up display.

Figure 7:
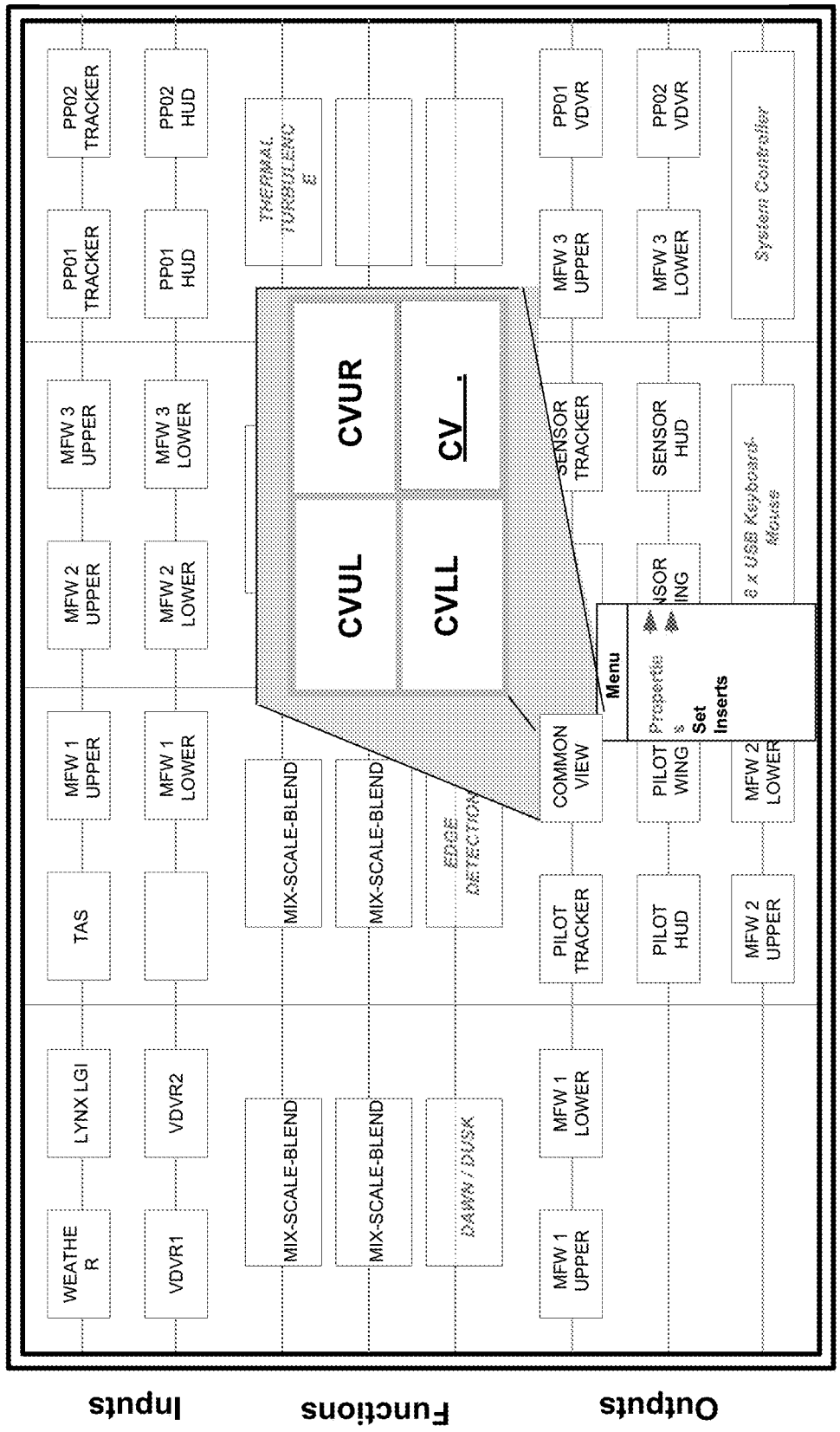
FIG. 7 illustrates an exemplary third step of the configuration of a system according to an embodiment of the invention.

In some embodiments, an exemplary third step illustrated in FIG. 7, allows a system user to define one or more virtual displays, such as optional picture-in-picture displays, that can be activated during system operation. A user can define one or more display areas (i.e., virtual displays) within any physical or conceptual display screen, which can then serve as a destination for an image stream that may have been processed through an image processing module (e.g., scaled, blended, chroma-keyed). For example, a common view display device may be partitioned into two or more virtual displays to allow multiple input streams to be displayed simultaneously, such as displaying multiple versions of a live image stream derived from different input sources or different image enhancement processes.

Additionally, in some embodiments, the user can define one or more touch sensitive areas, also referred to as virtual buttons 189, on an external display monitor that can be monitored for touch activity to control the system or to emit user programmable data strings to one or more external computers or devices (e.g., data strings might be used to tune a radio or other external device) associated with the display.

Figure 8:
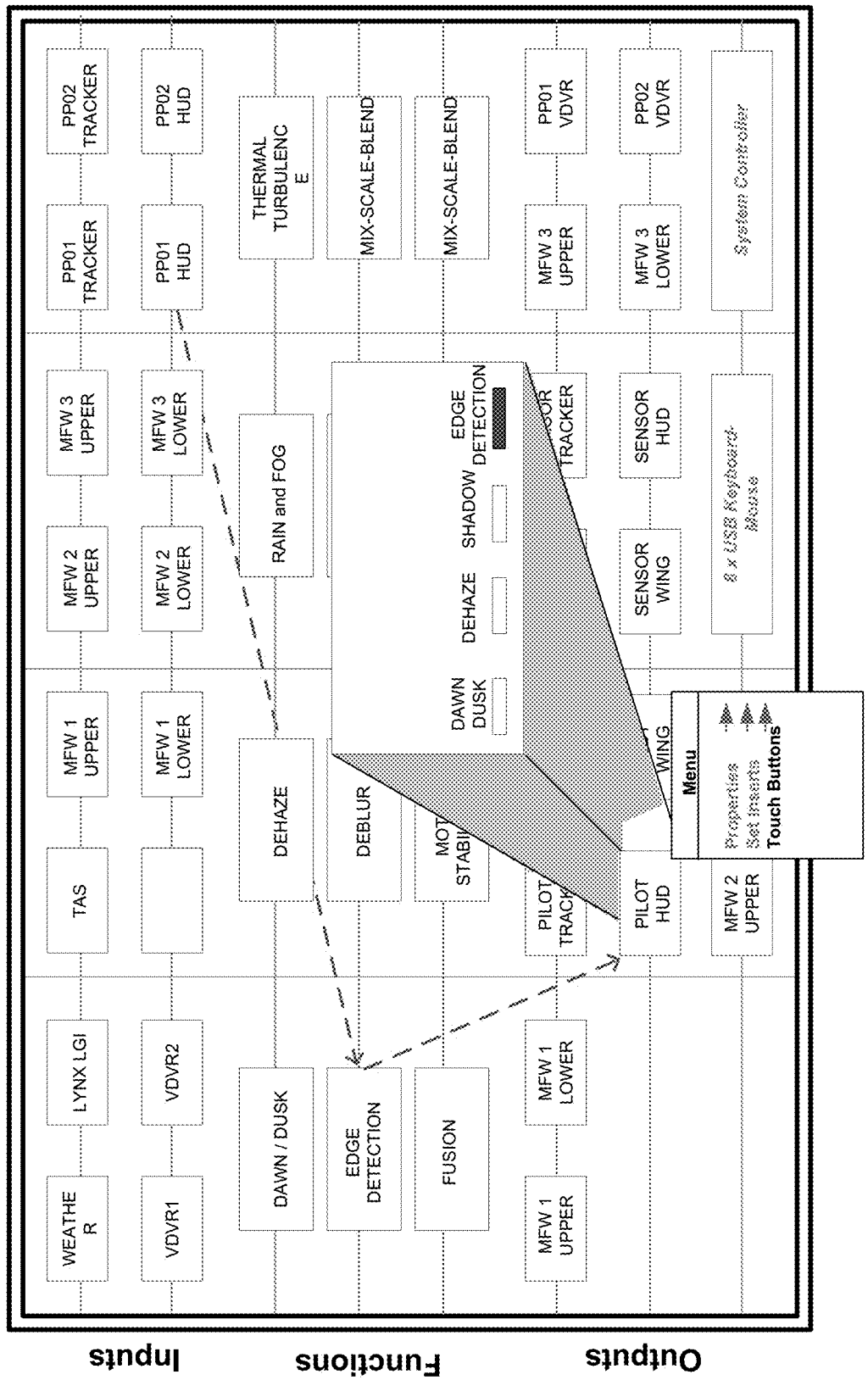
FIG. 8 illustrates an exemplary fourth step of the configuration of a system according to an embodiment of the invention.

In the exemplary fourth step, as illustrated in FIG. 8, a plurality of desired system commands are named and defined by selecting routing configurations corresponding the desired command. For example, as described with respect to FIG. 6, the PPO-1 HUD data stream is routed to the pilot HUD display and the system may be configured such that a command is defined by a route between the source and destination that is intersected by one or more functional modules, such as an edge detection command resulting in the PPO-1 data stream being routed through an edge detection function prior to display on the pilot HUD.

Figure 9A:
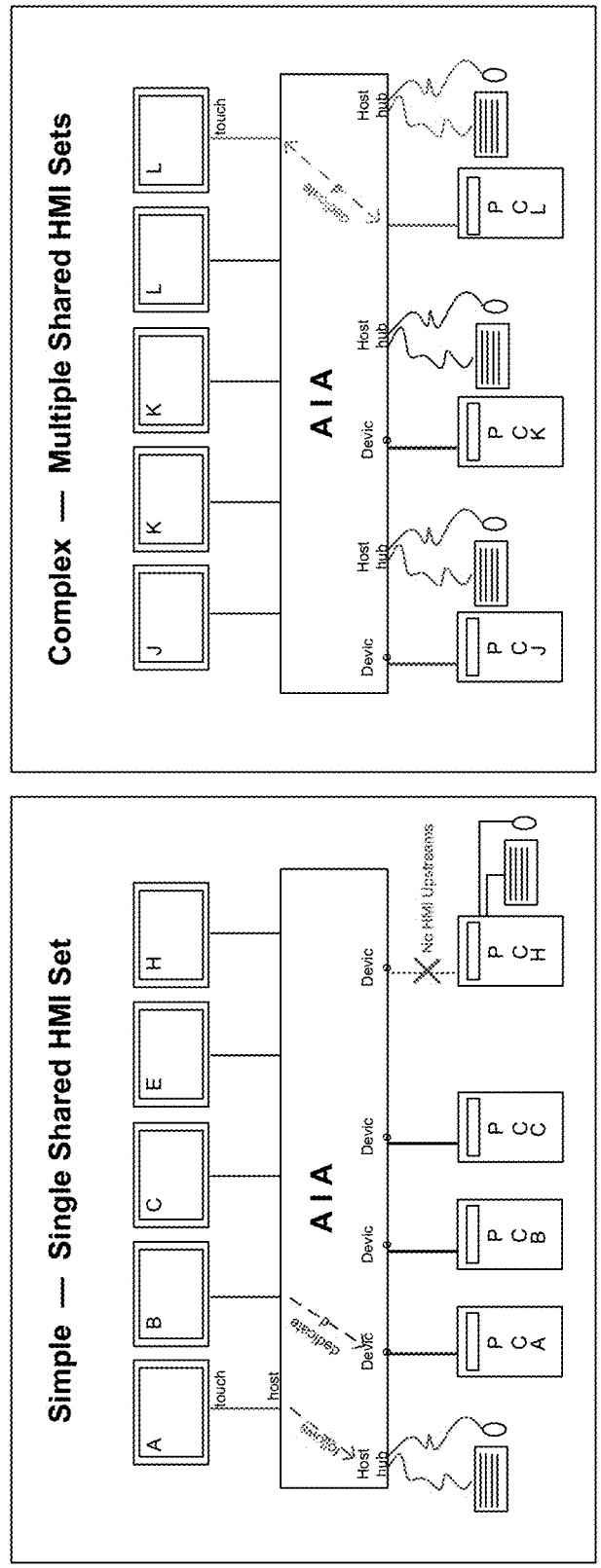
FIG. 9A illustrates how system and connected device control can be centralized or distributed using exemplary system routing functions according to an embodiment of the invention.

FIG. 9A illustrates how system and connected device control can be centralized or distributed using exemplary system routing functions. For example, a human machine interface (HMI) such as a keyboard and mouse may be coupled to the switch fabric such that it is able to control the implementation of the predetermined commands and to reroute streams according to the desires of the system user. Multiple HMIs may be provided and may share control or be given control of a subset of the input and output devices according to system configuration. Accordingly, an additional step of system configuration may comprise mapping the HMIs between the display devices, the source devices, and the functional image processing modules.

Additionally, although not shown, in some embodiments, a display device can communicate human interface device (HID) touch screen or operator button events back to the system through the output interface providing it with an image source. By doing so, the system eliminates the need for an additional cable and or an external computer to monitor and react to the human interface device events for purposes of controlling the system. Additionally, the system can appropriately route human interface device (HID) events to source computers associated with a particular virtual display inserted within a display device.

For example, the touch screen events may be detected by the display device and passed back to the system (i.e., the image source) using a Display Data Channel (DDC) to control the configuration and routing of the system. The Display Data Channel (DDC) is a serial bus incorporated into some video monitors, thereby allowing some of those specifically configured display devices to provide their image source with descriptive data called Extended Device Identification Data (EDID). Though this serial channel is normally used to query the display for identification or operating attributes, in the current example it is being utilized to also relay control information from the display device to the system. It should be appreciated that other channels similar to that of the Display Data Channel incorporated into an image source connection could also be utilized to implement similar functionality in other embodiments.

Figure 9B:
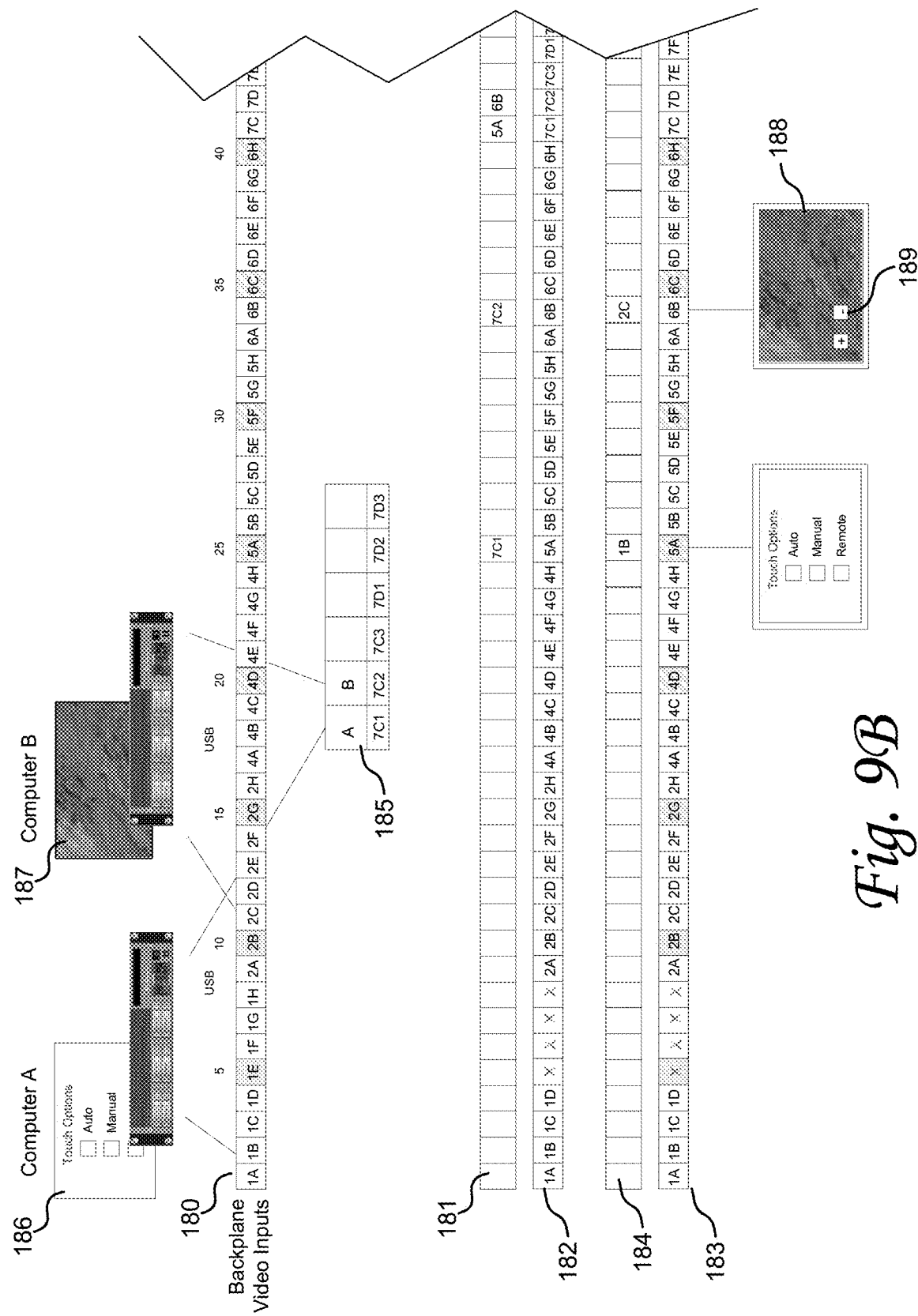
FIG. 9B illustrates an exemplary switch fabric implementation of device control according to an embodiment of the invention.

FIG. 9B illustrates an exemplary method of implementing distributed system control functions according to an embodiment of the invention. In this embodiment, input port array 180, output port array 183, and mapping table 184 are substantially similar to the corresponding arrays described with respect to FIG. 3B. Additionally, control port arrays 182 and 185 are provided to allow reconfigurable control of input devices 186 and 187. In this embodiment, input devices 186 and 187 are electrically coupled to output control port array 185 to allow control signals to be transmitted from output control port array 185 to the input devices 186 and 187. For example, the control signals may be transmitted according to a USB standard and the output control port array 185 may comprise a plurality of addressable USB ports. In the illustrated embodiment, an input control port array 182 is provided with ports corresponding to the output ports of array 183. These ports are mapped 181 to output control ports of output control port array 185. For example, display device 188 may comprise a touch screen display with a video connection coupled to output ports 6B of array 183 and a USB connection coupled to port 6B of array 182. Port 6B of array 182 is mapped to port 7C2 of array 185, which is in turn electrically coupled to input device 187. Accordingly, touch commands executed on display 188 are transmitted to input device 187. As described herein, in embodiments employing USB or other full-duplex control protocols, modules may be coupled to the ports of array 182 and array 185 to allow the full-duplex control protocols to be translated into corresponding half duplex signals for transmission through the system and to be retranslated into the original full-duplex control signals for transmission to the input devices.

Figure 10:
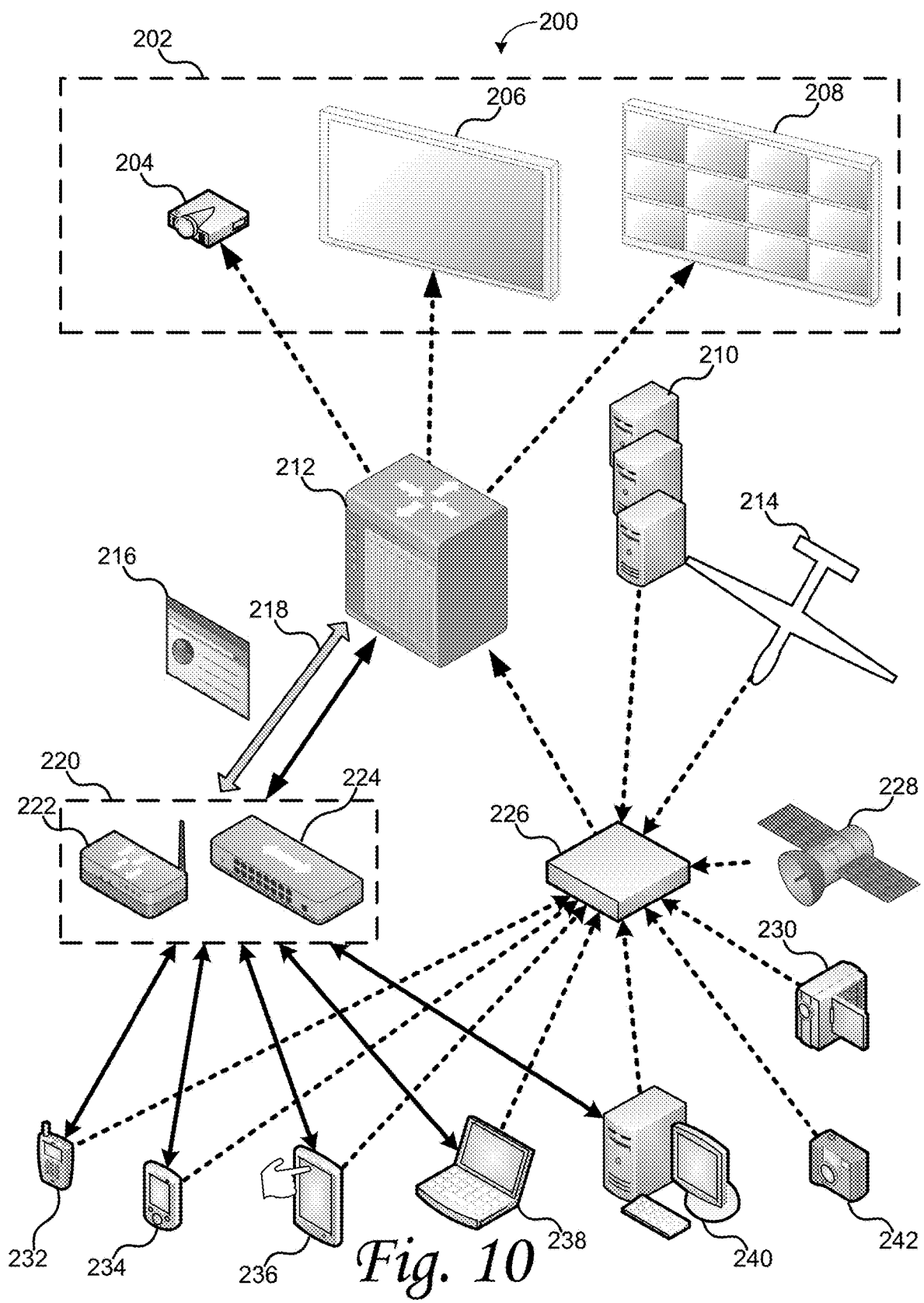
FIG. 10 illustrates an environment in which an exemplary system is collaboratively switching between an image stream input interface and an image stream output interface according to an embodiment of the invention.

FIG. 10 illustrates an environment 200 in which an exemplary system 212 is collaboratively switching between an image stream input interface and an image stream output interface according to an embodiment of the invention. The environment 200 comprises the system 212 for collaboratively switching between image input stream interfaces and image output stream interfaces, image stream output devices 202, an image input stream hub 226 (e.g., video hub), and a network switch/routing device 220. The system 212 may be implemented such that selective mapping (by the system 212) can be configured on-the-fly from multiple points of access simultaneously and interactively with two or more users (e.g., through a computing device, such a laptop, tablet, or smartphone).

According to some embodiments, the system 212 comprises a plurality of image stream input interfaces, a plurality of image stream output interfaces, and a switching matrix. Through each of the plurality of image stream input interfaces, the system 212 may receive an image input stream from an image stream generating device, such as a smartphone 232, a personal digital assistant (PDAs) 234, a tablet 236, a laptop 238, a desktop computer 240, a camera 242, a video camera 230, a radar device, a medical device, a surveillance device (e.g., UAVs 214 or satellites 228), or an array of servers 210.

Various image stream generating devices may couple to the image stream input interfaces through an image input stream hub 226, such as a video hub, which allows the system 212 to be remotely located with respect to the image stream generated devices to which it is coupled. Use of the image input stream hub 226 may be beneficial where the image stream output device 202 is in a conference room setting, the system 212 is located in a room outside the conference area (e.g., an equipment room), and various users in the conference room wish to couple their respective laptops (or other computing devices) to the system 212 for output to the image stream output device 202. In such a setting, the image stream hub 226 may be placed within the conference area, for example, on a conference table.

Through each image stream output interface, the system 212 may output an image input stream (e.g., from an image stream input or as processed by one or more image processing modules) to an image stream output device, such as a projector 204, a large video display 206 (e.g., a plasma or liquid crystal display), or a multi-display video wall 208, any of which may function as a video wall. In certain embodiments, the system 212 may be implemented and integrated into the image stream output device (e.g., video monitor, computer monitor, or projector) as one or more integrated components. Such an embodiment would, for example, allow a device providing an image stream (e.g., an image stream generating device) to be directly connected to the image stream output device and selectively mapped to virtual displays being shown on the image stream output device. Additionally, for some embodiments, an image stream (e.g., from the image stream input interface or an image processor module) may be selectively mapped to a virtual display being outputted through a single image stream output interface. It should be understood that a single image stream output interface may output one or more virtual displays simultaneously, each possibly having a different image stream source.

The switching matrix in the system 212 may be in communication with the image stream input interfaces and the image stream output interfaces, and may be configured to selectively map an image stream input interface of the plurality of image stream input interfaces to an image stream output interface of the plurality of image stream output interfaces. Additionally, for some embodiments, the switching matrix may selectively map image streams, received through the image stream input interfaces, to one or more image processor modules (such as the ones described herein) before selectively mapping the resulting processed image streams to the image stream output interfaces.

A collaborative control interface of the system 212, which may be embedded in the system 212 and accessible by two or more users simultaneously, may permit two or more users to operate the system, configure the system (e.g., configure a selectively mapping by the switching matrix), or check status of the system. For instance, where the collaborative control interface is web-based, a web-based collaborative control interface 216 may be simultaneously accessible by two or more users through their respective computing devices, and the two or more users can respectively issue commands to the system 212 that may cause the system 212 to a change operation, change configuration, or provide a status. By this functionality, two or more users can collaboratively control the system 212.

Those skilled in the art will appreciate that though the collaborative control interface may be capable of simultaneous access by two or more users, and may facilitate control of the system 212 by the two or more users, this does not exclude a single user from accessing the collaborative control interface or from controlling the system 212 through the collaborative control interface.

By way of example, consider a "war room" situation where a team of users is assembled to collaborate on strategy and planning, and each team member (i.e., user) will bring a laptop containing data, notes, and related materials. According to some embodiments, at any point during a group discussion, a member of the team may desire to display information from his image stream output generating device (e.g., laptop, cell phone, camera, or other video source). In response to the new displayed information, another team member may desire to present additional video information from his laptop, or another source such as a live video feed from a surveillance camera or the UAV 214. Using the system 212 (or some variation thereof), a first user may, through the web-based collaborative control interface 216 (e.g., through their laptop), configure the system 212 to open up a live chat window (e.g., on their laptop) on a video wall (e.g., in a first virtual display of the video wall) to communicate with other meeting participants located in a remote location. Concurrently or thereafter, a second user may, through the web-based collaborative control interface 216 (e.g., through their laptop), configure the system 212 to open up slide-show presentation (e.g., from a tablet) on the video wall (e.g., in a second virtual display of the video wall) in another window adjacent the live chat window. Effectively, team members can dynamically configure the video switch on-the-fly and through the web-based collaborative control interface 216 accessed over a network connection (e.g., Ethernet or WiFi). Team members may open, close, resize, or reposition a virtual display, and determine the image stream source for the virtual display.

As described herein, the collaborative control interface of the system 212 may be implemented as a web-based interface 216, which may be accessible by two or more users simultaneously and which is generally accessed over a network connection. Accordingly, for some embodiments, the web-based collaborative control interface 216 may be accessed by users using their respective computing devices (e.g., smartphone 232, personal digital assistant (PDA) 234, table 236, laptop 238, desktop computer 240) having a web browser. These computing devices may establish a network connection with the system 212 through a network switch/router 220 (e.g., wireless router 222, or a network switch 224). Depending on the embodiment, access to the web-based collaborative control interface 216 may be restricted to network connections within an intranet, restricted to network connections through an extranet, or may be generally open to network connections over the Internet.

As also described herein, the collaborative control interface may enable collaborative operation of the system 212, configuration of the system 212, or status viewing of the system 212, by two or more users having simultaneous access to the collaborative control interface. For particular embodiments, the operation, configuration and status viewing may be facilitated using commands 218 that the two or more users issue to the system 212 using the collaborative control interface (e.g., web-based interface 216). With respect to operation of the system 212, commands may include, for example powering the system 212 on or off, or resetting the system 212. With regard to configuring the system 212, commands may include configuring the selective mapping between one or more image stream input interfaces, one or more image stream output interfaces, and (where applicable) one or more image processing modules, settings for the one or more image processor modules (where applicable), user settings (e.g., user type, username, user password), access control to the collaborative control interface (e.g., user dependent user control), network settings for the system 212, image stream input interface or image stream output interface settings (e.g., resolution, frame rate, format, or protocol), or virtual display settings (e.g., open, close, resize, or reposition). In regard to status viewing of the system 212, commands may include requesting a power status, network settings, image stream input interface settings, image stream output interface settings, collaborative control interface settings, or current operation of the system 212 (e.g., which interfaces are currently active, which ones have active virtual displays, or which users are using the system 212).

Figure 11:
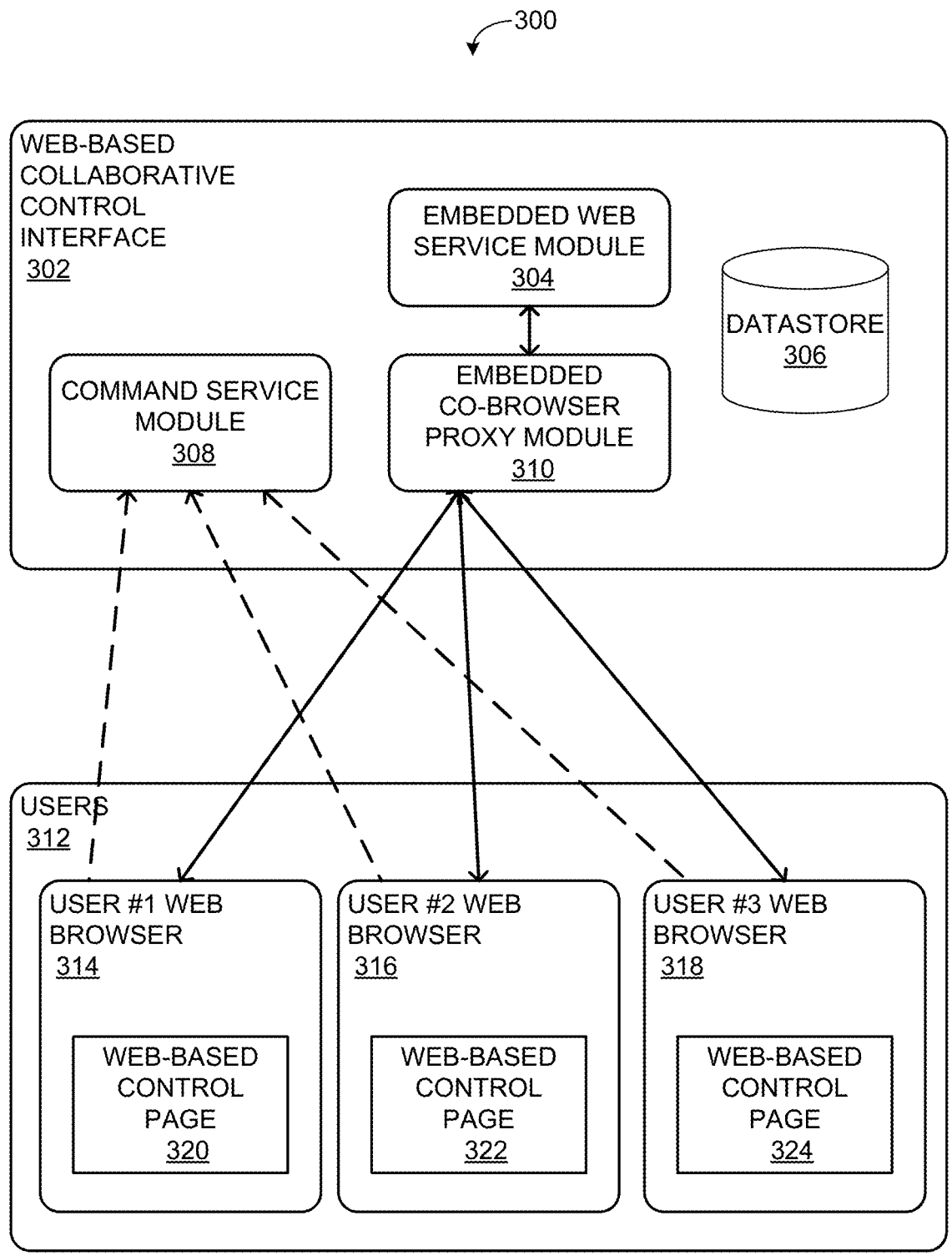
FIG. 11 illustrates an exemplary web-based collaborative control interface in use according to an embodiment of the invention

FIG. 11 illustrates an exemplary web-based collaborative control interface 302 in use in an environment 300 according to an embodiment of the invention. The web-based collaborative control interface 302 may be used by the system 212 (which collaboratively switches between an image stream input interface and an image stream output interface) to facilitate collaborative operation, configuration, or status viewing of system 212 by two or more users. As shown, the web-based collaborative control interface 302 comprises an embedded web service module 304, a command service module 308, an embedded co-browser proxy module 310, and a datastore 306.

According to some embodiments, the web-based collaborative control interface 302 may provide dynamic configuration capabilities through the embedded web service 304 (e.g., hypertext markup language [HTML] service) that works in conjunction with the embedded co-browser proxy module 310. The embedded web service 304 may provide users with a user interface (UI) through a web-based control page that allows users to operate, control, or request status from the system 212. The embedded co-browser proxy module 310 may allow multiple users to interact with the web-based control page and change it concurrently and in a collaborative manner.

To enable the operation, configuration, or status viewing of the system 212, the command service module 308 may receive, and subsequently perform, commands (relating to operation, configuration, or status viewing) resulting from user interactions with the web-based control page. For some embodiments, the command service module may perform commands in accordance with the order in which the commands are received (e.g., timestamps at which commands are received by the web-based collaborative control interface 302), the type of command issued (e.g., administrative-level vs. non-administrative-level command), or the user issuing the command (e.g., administrative user vs. regular user). The datastore 306 may store data that facilitates operation by the embedded web service module 304, the command service module 308, or the embedded co-browser proxy module 310.

In environment 300, users 312 may access and interact with the web-based collaborative control interface 302 through their respective web browsers 314, 316, and 318 on their respective computing devices (e.g., laptop, tablet, or desktop computer), which may be in network communication with the web-based collaborative control interface 302. When the users 312 access the web-based collaborative control interface 302, each of the users 312 may be respectively presented with a web-based control page 320, 322 or 324. The web-based control page 320, 322, and 324 may enable the users 312 to collaboratively interact with the web-based collaborative control interface 302, thereby permitting collaborative control of the system 212 through the web-based collaborative control interface 302.

While accessing the web-based control page 320, 322, and 324, the users 312 may view the current status of the system 212, operate features of the system 212, or configure features of the system 212, in or near real-time. To request a status from the system 212, operate a feature of the system 212, or configure a feature of the system 212, the users 312 may issue one or more commands to the system 212 from their respective web-browsers 314, 316, and 318 (i.e., via web-based control pages 320, 322, and 324) to the embedded web service module 304 and the embedded co-browser proxy module 310. The commands, for example, may configure the system 212 to open, close, resize, or reposition virtual display in an image stream output device (e.g., display, projector, or video wall) and to determine the source of each virtual display (e.g., the image stream input interface feeding each virtual display). The command service module 308 may subsequently receive and perform those commands for the system 212.

Though the web-based control page 320, 322, and 324 presented to each of the users 312 may be similar to each other, the web-based control page 320, 322, and 324 may differ. For example, the web-based control page 320 for user #1 may differ from the other web-based control pages 322 and 324 based when user #1 last updated his or her web browser 314, the user credentials used by user #1 to access the web-based page (e.g., control page may differ between usernames or user types), or the feature of the web-based control page 320 user #1 is currently accessing. For instance, where user #1 is an administrative user, and users #2 and #3 are non-administrative users, some of the features shown as available/accessible on the web-based control page 320 of user #1 may not be shown as available/accessible on the web-based control pages 322 and 324 of users #2 and #3, respectively.

According to some embodiments, the web-based collaborative control interface 302 may provide a web-service (e.g., SOAP services) accessible to applications or systems external to the system 212, thereby allowing such applications or systems to remotely control the system 212 through web-service calls. In doing so, the web-based collaborative control interface 302 may permit the system 212 to function in concert with heterogeneous systems compatible with the system 212. For example, in a conference room setting, the web-services provided by the web-based collaborative control interface 302 may allow the system 212 to function along with an overall conference control system that controls lighting in the conference room and/or the deployment of monitors and displays (e.g., image stream output devices to which the system 212 may be coupled).

Figure 12:
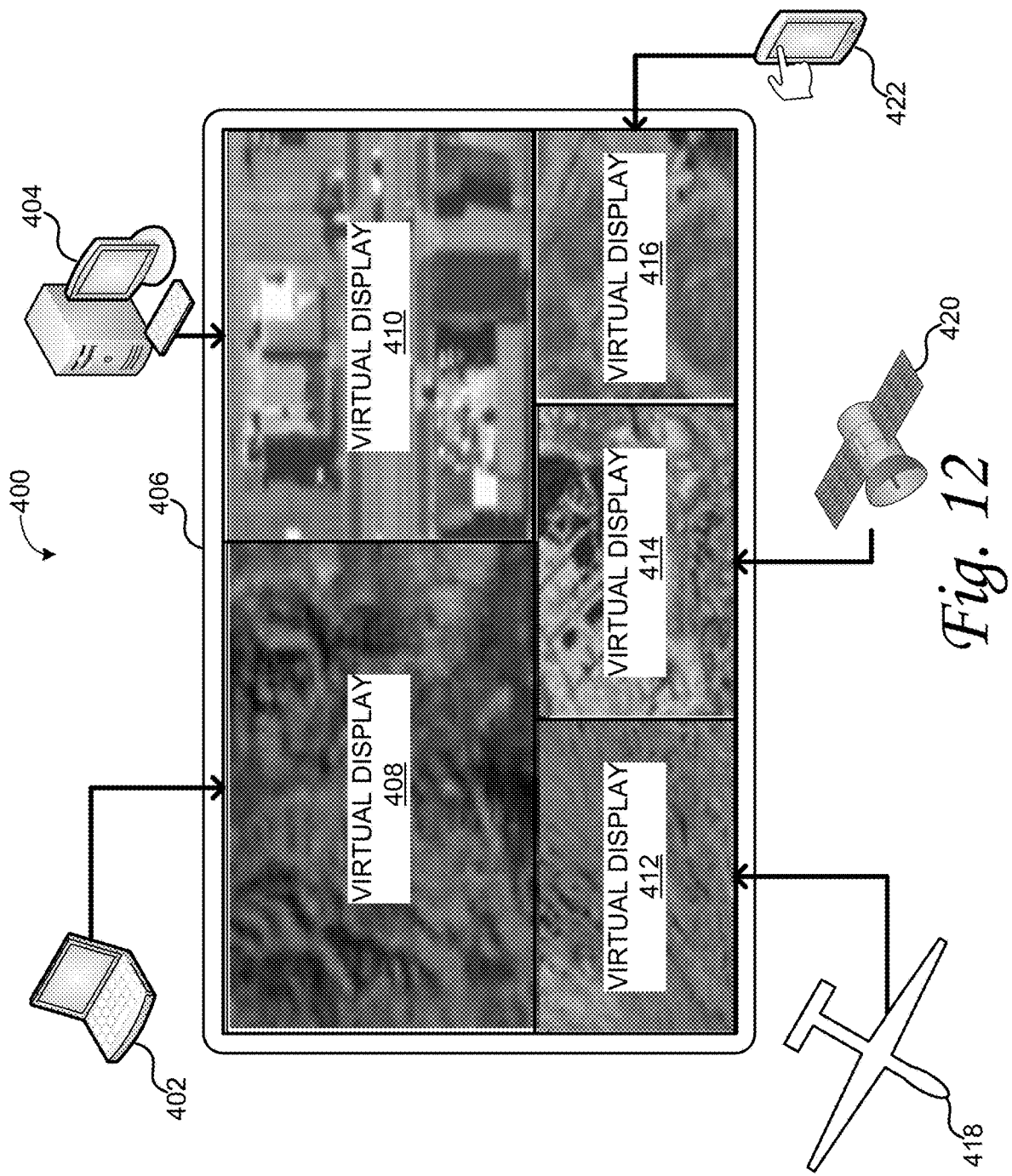
FIG. 12 illustrates output from an exemplary system for collaboratively switching according to an embodiment of the invention.

FIG. 12 illustrates output 400 from an exemplary system for collaboratively switching according to an embodiment of the invention. In output 400, the exemplary system is presenting multiple virtual displays 408, 410, 412, 414, and 416 using a display 406. According to some embodiments, the position and size of the virtual displays 408, 410, 412, 414, and 416 may be determined according to the collaborative control and configuration of the exemplary system by two or more users.

The collaborative control and configuration may also determine the source image stream input stream of each of the virtual displays 408, 410, 412, 414, and 416. For example, the virtual display 408 may be configured to receive from a laptop 402, the virtual display 410 may be configured to receive from a desktop computer 404, the virtual display 412 may be configured to receive from an unmanned aerial vehicle (UAV) 418, the virtual display 414 may be configured to receive from a surveillance satellite 420, and the virtual display 416 may be configured to receive from a tablet 422.

Figure 13:
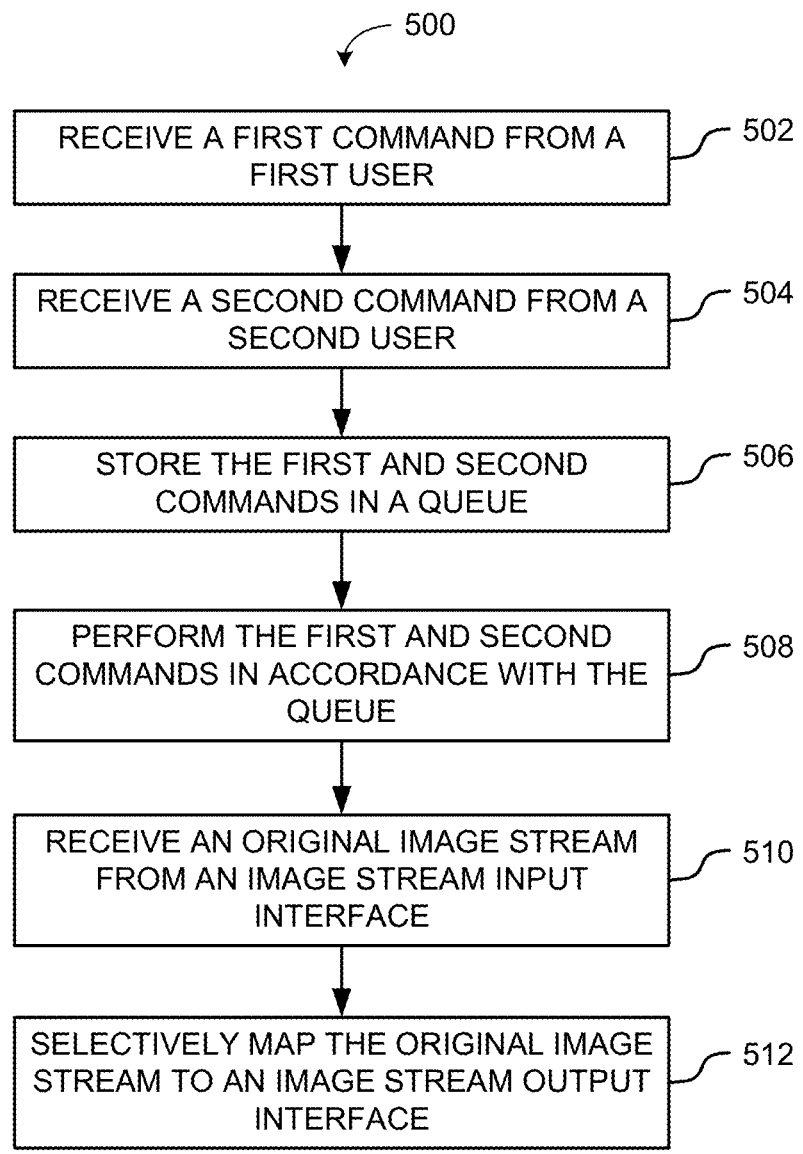
FIG. 13 illustrates an exemplary method for switching control between a plurality of computer systems according to an embodiment of the invention.

FIG. 13 illustrates an exemplary method 500 for switching control between a plurality of computer systems according to an embodiment of the invention. For some embodiments, the method 500 may determine how two or more users may collaboratively operate, configure, or view a status of the system 212 using commands (e.g., command received via a collaborative control interface).

The method 500 may begin at operation 502, where a first command may be received from a first user. At operation 504, a second command may be received from a second user a second user. The first and second commands may relate to operating, configuring, or viewing a status of the system 212, and may have been issued by the first and second users through their respective computing devices (e.g., the first user from his or her laptop, and the second user from his or her tablet). For some embodiments, the first and second commands may be received via a collaborative control interface of the system 212, such as the web-based collaborative control interface 302 of FIG. 3.

At operation 506, the first and second commands are stored in a queue at the system 212. The order in which commands are stored and arranged in the queue may depend on the particular embodiment. For instance, according to some embodiments, the first and second command may be stored and arranged in the queue according to the order in which the first and second commands are received (e.g., based on a transmit or receive timestamp), the type of command issued (e.g., administrative-level vs. non-administrative-level command), the user issuing the command (e.g., administrative user vs. regular user), or some combination thereof. To facilitate preemption of control by administrative users, some embodiments may store and arrange commands from administrative users in the queue such that they have priority over commands from non-administrative users (e.g., store the commands at the beginning of the queue). Further, some embodiments can be configured to restrict storage of commands to only administrative users (e.g., when an administrative user desires control of the system 212 to the exclusion of all non-administrative users).

At operation 508, the first and second commands may be performed in accordance with the queue. For some embodiments, performing of commands in accordance with the queue may involve performing commands according to the order in which they are stored in the queue, or according to the priority of commands in the queue (e.g., higher priority commands in the queue are performed first).

At operation 510, an original image stream may be received at an image stream input interface of the system 212. Subsequently, the original stream may be selectively mapped to an image stream output interface of system 212. The selective mapping of the original image stream may be according to the current configuration of the system 212, which may be determined (i.e., influenced) by the first and second commands performed at operation 508. Additionally, the configuration of the system 212 may be such that the original stream (received at the image stream input interface) is selectively mapped through one or more image processing modules of the system 212, and the resulting processed image stream is eventually selectively mapped to the image stream output interface in place of the original stream.

Figure 14:
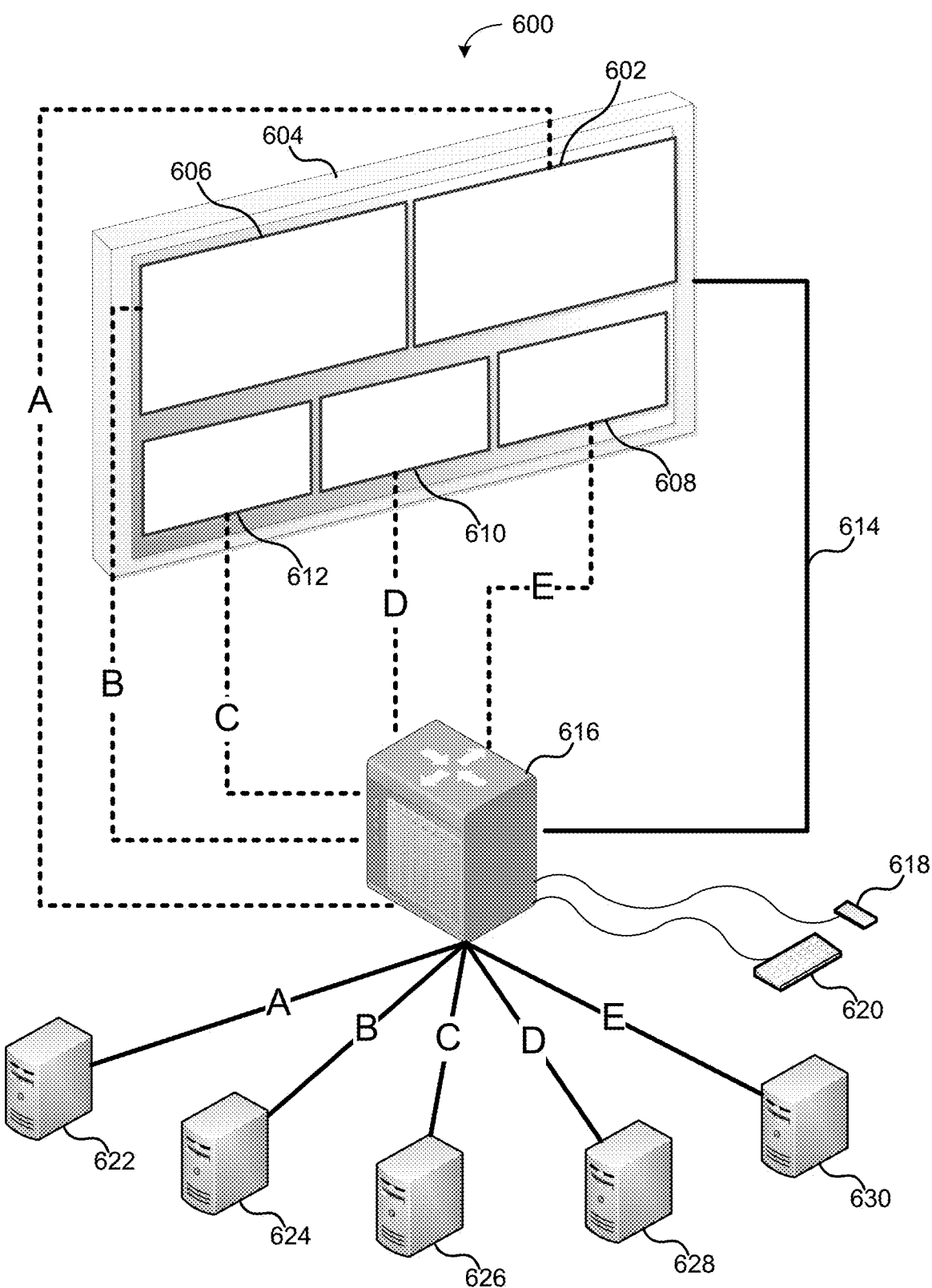
FIG. 14 illustrates an exemplary system for switching control between a plurality of computer systems according to an embodiment of the invention.

FIG. 14 illustrates an exemplary system 616 for switching control between a plurality of computer systems according to an embodiment of the invention. As shown, the system 616 is coupled to a display 604 (via connection 614), computer systems 622, 624, 626, 628, and 630, a keyboard 620, and a mouse 618. The system 616 is selectively mapping image streams from the computer systems 622, 624, 626, 628, and 630 to virtual displays 602, 606, 608, 610, and 612, each of which is being outputted to the display 604.

According to some embodiments, the system 616 may comprise one or more image stream input interfaces, one or more image stream output interfaces, and a switching matrix. Through each image stream input interface, the system 616 may receive an image input stream from a computing device (e.g., computer system 622, 624, 626, 628, or 630) that is configured to couple with a human machine interface, such as the keyboard 620 or the mouse 618.

Through each image stream output interface, the system 616 may output an image input stream (e.g., from an image stream input or as processed by one or more image processing modules) to an image stream output device, such as the display 604. For some embodiments, the system 616 may selectively map an image stream (e.g., from the image stream input interface or an image processor module) to a virtual display being outputted through a single image stream output interface. It should be understood that a single image stream output interface may output one or more virtual displays simultaneously, each possibly having a different image stream source.

The system 616 may further comprise one or more central computer input device interfaces and one or more general computer input device interfaces. Each of the central computer input device interfaces may be configured to couple to a human machine interface (HMI) devices, while each of the general computer input device interfaces may be configured to couple to an individual computer system. Examples of computer input device interfaces and computer output device outputs may include, without limitation, Universal Serial Bus (USB), FireWire, PS/2, AT, RS-232, and Bluetooth.

The switching matrix in the system 616 may be in communication with the image stream input interfaces, the image stream output interfaces, the central computer input device interfaces, and the general computer input device interfaces, thereby allowing the switching matrix to selectively map an image stream input interface to an image stream output interface of the plurality of image stream output interface and map a central computer input device interface to a general computer input device interface. For some embodiments, the switching matrix may selectively map image streams, received through the image stream input interfaces, to one or more image processor modules (such as the ones described herein) before selectively mapping the resulting processed image streams to the image stream output interfaces.

For certain embodiments, the central computer input device interfaces may be grouped into one or more control input groups, and the general computer input device interfaces may be grouped into one or more control output groups, such that the switching matrix may selectively map a control input group may to an control output group by the system 616. In this way, each control input group may be coupled to a human machine interface (HMI) pairing (e.g., keyboard-mouse pairing), each control output group may be coupled to an individual computer system, and the switching matrix can selectively map control information from the HMI pairing to the individual computer system that a computer operator (i.e., user) desires to control.

For some embodiments, the switching matrix of the system 616 may be configured to automatically convert control information between a central computer input device interface and a general computer input device interface when a difference in protocol or interface type exists between the two. Further, the automatic conversion between central computer input device interfaces and general computer input device interfaces may include conversion between a control input group and a control output group.

In FIG. 14, the connection 614 may couple the display 604 to an image stream output interface of the system 616. The keyboard 620 and the mouse 618 may be coupled to a first control input group of the system 616, where the first control input group comprises at least two central computer input device control interfaces (e.g., the keyboard 620 is coupled to a USB interface of a first control input group, and the mouse 618 is coupled to a Bluetooth interface of the first control input group). The output image stream output interface (e.g., VGA, DVI, HDMI, or DisplayPort) of each of computer systems 622, 624, 626, 628, and 630 may be coupled to an individual image stream input interface of the system 616, and the computer input device interfaces of each of computer systems 622, 624, 626, 628, and 630 may be coupled to an individual control output group of the system 616. The individual control output group may comprise at least two central computer input device control interfaces (e.g., a USB interface of the computer system 622 is coupled to a USB interface of a first control output group, and a mouse PS/2 interface of the computer system 622 is coupled to a mouse PS/2 interface of the first control output group).

The display 604 is just one example of an image stream output device that may be coupled to the system 616. Other suitable image stream output devices may include, without limitation, a projector or a multi-display configuration. Generally, the display 604 may be one that is appropriate to function as a video wall (e.g., in a Network Operation Center, or Emergency Operation Center). For certain embodiments, the system 616 may be integrated into the display 604 as one or more components. Where the system 616 is integrated into the display 604, at least one image stream output interface of the system 616 may be internally coupled to the display 604. Additionally, where applicable, other image stream output interfaces of the system 616 may be provided as image stream output interfaces of the display 604.

As represented by the dashed lines of FIG. 14, the system 616 is selectively mapping the image stream A from the computer system 622 to the virtual display 602, the image stream B from the computer system 624 to the virtual display 606, the image stream C from the computer system 626 to the virtual display 612, the image stream D from the computer system 628 to the virtual display 610, and the image stream E from the computer system 630 to the virtual display 608.

Based on the actions of a computer operator (e.g., with respect to the keyboard 620 or the mouse 618, or with respect to the system 616), the system 616 may selectively map control by the keyboard 620, the mouse 618, or both, to a single one of the computer systems 622, 624, 626, 628, and 630. When subsequent actions by the computer operator constitute a request to the system 616 to switch control (i.e., switch control by the keyboard 620 and the mouse 618 to another computer system), the system 616 may selectively map control by the keyboard 620, the mouse 618, or both to another one of the computer systems 622, 624, 626, 628, and 630. As noted herein, the switching matrix of the system 616 may this selective mapping by routing the central computer input device interface coupled to the keyboard 620 or the mouse 618, to the general computer input device interfaces that corresponds to one of the computer system 622, 624, 626, 628, or 630.

Exemplary actions by the computer operator that may constitute a request to switch control between computer systems may include, without limitation, predetermined keystrokes (e.g., on the keyboard 620), predetermined movements of a mouse (e.g., the mouse 618), or a direct selection request to the system 616 (e.g., via a control panel coupled to the system 616). Further examples of actions may include tracking the movement and/or positioning of an input cursor (e.g., a keyboard prompt or a mouse pointer) that is shown on an image stream output device (e.g., the display 604) and controlled by a computer input device (e.g., controlled by the keyboard 620 or the mouse 618).

In instances where one or more virtual displays is being outputted to an image stream output device, and where the image stream of at least one of the virtual displays is being sourced from a given computer system, some embodiments may track the movements and/or positioning of an input cursor with respect to the virtual displays to determine when control by an computer input device (that is controlling the input cursor) should switch to the given computer system. For some embodiments, movement and/or positioning tracking of the input cursor may be with respect to display regions defined relative to the virtual displays. As such, for some embodiments, display region may be defined with boundaries that coincide with or exceed the boundaries of a given virtual display.

In the case of FIG. 14, where multiple virtual displays 602, 606, 608, 610, and 612 are being outputted to the display 604 and the computer systems 622, 624, 626, 628, and 630 are providing image streams to the virtual displays, the system 616 may switch control by the keyboard 620 or the mouse 618 based on the movement and/or positioning of an input cursor that is being controlled by either the keyboard 620 (i.e., keyboard cursor) or the mouse 618 (i.e., mouse cursor). For instance, when a mouse pointer controlled by the mouse 618 is positioned (on the display 604) within a display region designated for the computer system 622 (e.g., the virtual display 602), the system 616 may switch control of the computer system 622 to the mouse 618, the keyboard 620, or both. Subsequently, when the mouse pointer controlled by the mouse 618 is positioned (on the display 604) within a display region designated for the computer system 626 (e.g., the virtual display 612), the system 616 may switch control of the computer system 622 to the mouse 618, the keyboard 620, or both.

As noted herein, according to some embodiments, the display regions designated for the computer system 622 and the computer system 626 may be respectively defined with boundaries that coincide with or exceed the boundaries of the virtual display 602 being sourced by the computer system 622.

Under certain embodiments, the computer system being controlled by a given computer input device may be independently determined based on the movement and/or positioning of the input cursor being controlled by the given input device. For instance, in the case of FIG. 14, control of a given computer system 622, 624, 626, 628, or 630 by the mouse 618 may be determined by the system 616 according to the movement and/or positioning of a mouse pointer being controlled by the mouse 618, independent of the movement and/or position of a keyboard prompt being controlled by the keyboard 620.

Under some embodiments, the computer system being controlled by a given computer input device may be tied to a group of computer input devices, such that the movement and/or positioning of any input cursor being controlled by the group can determine which computer system the group of computer input devices is controlling. Based on some embodiments described herein, computer input devices may be grouped together according to control input groups of the system 616 (each comprising a grouped set of central computer input device interfaces). For example, if the keyboard 620 and the mouse 618 are coupled to central computer input interfaces belonged to a common control input group (e.g., first computer input group), control of a given computer system 622, 624, 626, 628, or 630 by the keyboard 620 and the mouse 618 may be determined by the system 616 according to the movement and/or positioning of a mouse pointer being controlled by the mouse 618 or the movement and/or position of a keyboard prompt being controlled by the keyboard 620.

Figure 15:
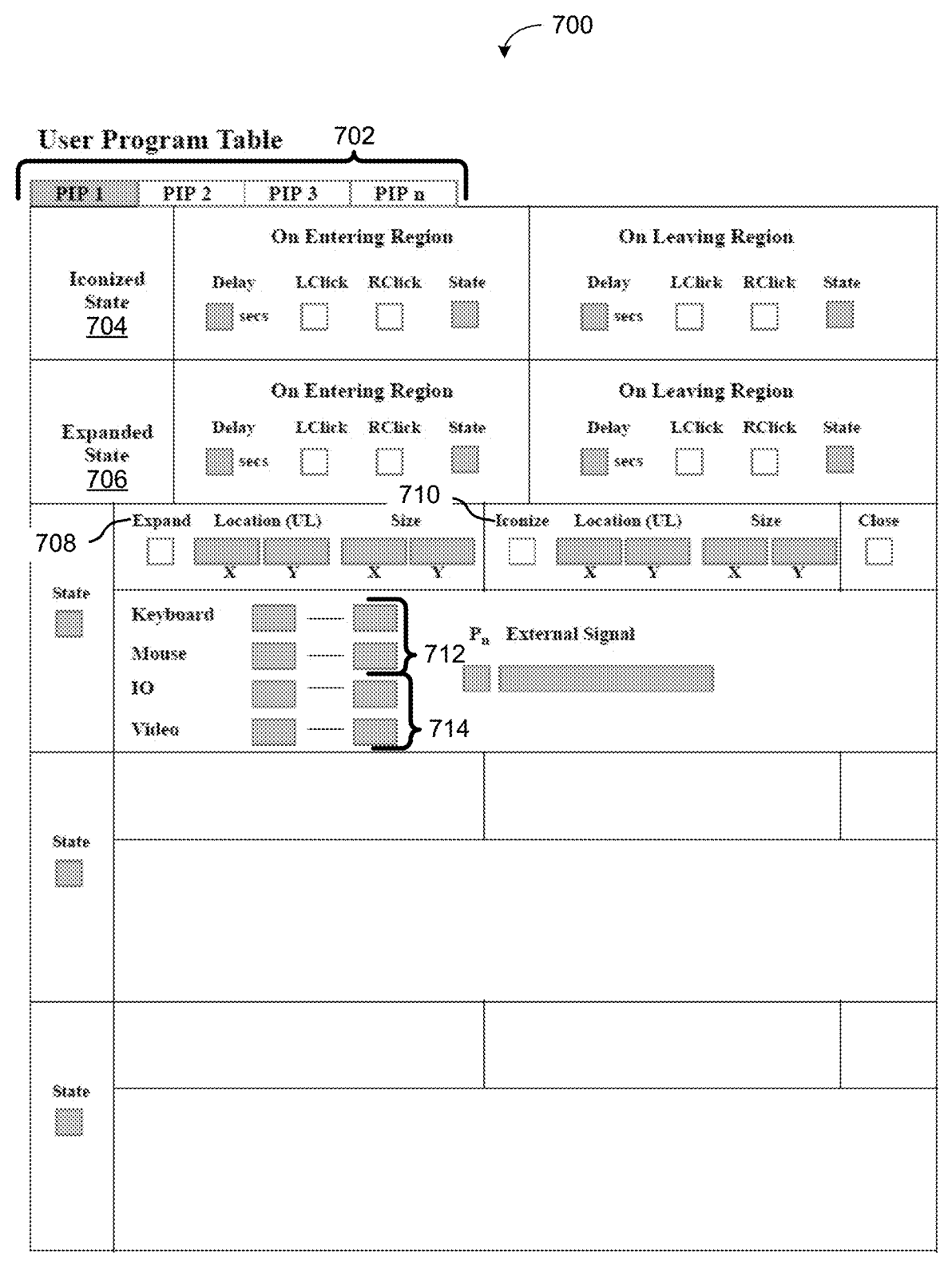

FIG. 15 illustrates an exemplary control interface 700 for switching control between a plurality of computer systems according to an embodiment of the invention. Through control interfaces such as the control interface 700, a computer operator may be able to define virtual displays (referred to as "PIP" in FIG. 15), define behavior of virtual displays (e.g., based on computer input device actions), define display regions for particular virtual displays, or define conditions under which control by one or more computer input devices should switch between computer systems.

In the particular case of FIG. 15, the control interface 700 may permit the computer operator switch between the settings of virtual displays 702. Once a the settings for a given virtual display is selected, the control interface 700 may permit a computer operator to define stream sources 714 for the given virtual display, define settings 704 for when the given virtual display should be iconized, define settings 706 when the given virtual display should be expanded, define the location 708 of the given virtual display when expanded, and define the location 710 of the given virtual display when iconized. To further enable switching control of computer systems by computer input devices, the control interface 700 may allow the computer operator to define coordinates 712 of display regions for the mouse and for the keyboard.

Figure 16:
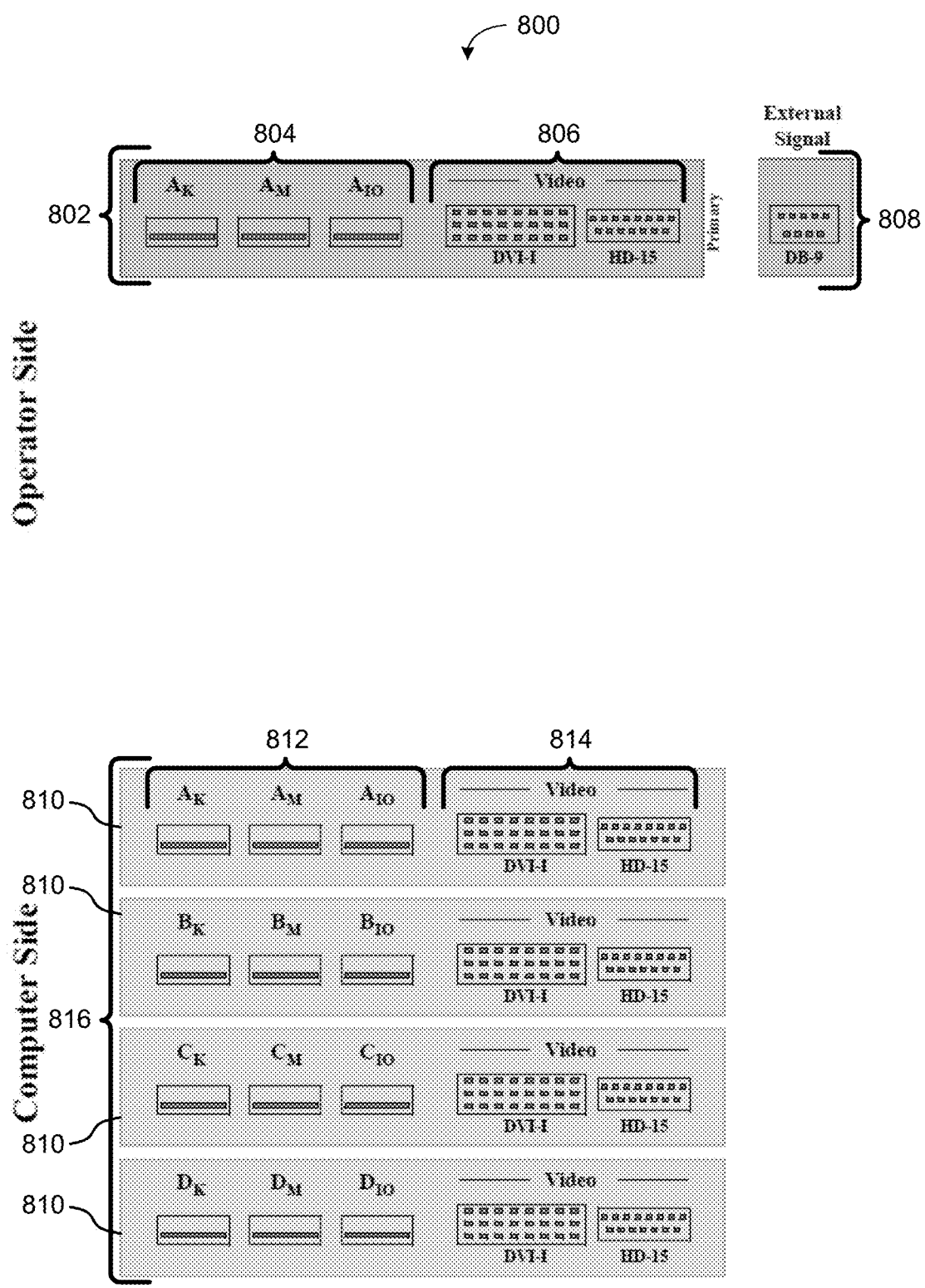
FIG. 16 illustrates exemplary image stream interfaces and computer input device interfaces of an exemplary system according to an embodiment of the invention.

FIG. 16 illustrates exemplary image stream and computer input device interfaces 800 of an exemplary system according to an embodiment of the invention. According to some embodiments, image stream and computer input device interfaces 800 may comprise a set of (computer) operator-side interfaces 802 and a set of computer side interfaces 816. Generally, the set of (computer) operator-side interfaces 802 may be configured to be coupled to computer input devices that feed computer input device information into the exemplary system (e.g., the system 616) and coupled to image stream output devices (e.g., the display 604) that receive image stream output form the exemplary system. The set of set of computer side interfaces 816, on the other hand, may be configured to couple to the computer input device interfaces and image stream output interfaces of a computer system to be used with the exemplary system.

In accordance with some embodiments, the set of (computer) operator-side interfaces 802 may comprise a control input group 804 that includes central computer input device interfaces, and one or more image stream output interfaces 806. The central computer input device interfaces of the control input group 804 may be configured to be coupled to the computer input devices (e.g., the keyboard 620 and the mouse 618) that a computer operator uses to control one or more computer systems through the exemplary system. The image stream output interfaces 806 may be configured to couple to one or more image stream output devices (e.g., the display 604) used to output image streams from the one or more computer systems under the control of the exemplary system. For certain embodiments, the set of operator-side interfaces 802 may include an external signal interface 808 for providing one or more image stream output devices with control information from the exemplary system.

In various embodiments, the set of set of computer side interfaces 816 may comprise interface groupings 810 where each grouping is configured to be coupled to an individual computer system that is to be controlled through the exemplary system. Depending on the embodiment, each interface grouping 810 may comprise a control output group 812 that includes general computer input device interfaces, and one or more image stream input interfaces 814. The general computer input device interfaces may be configured to couple to the corresponding computer input device interfaces of a computer system (e.g., computer system 622, 624, 626, 628, or 630) to be controlled through the exemplary system. Likewise, the image stream input interfaces 814 may be configured to couple to the corresponding computer input device interfaces of a computer system (e.g., computer system 622, 624, 626, 628, or 630) to be controlled through the exemplary system.

Figure 17:
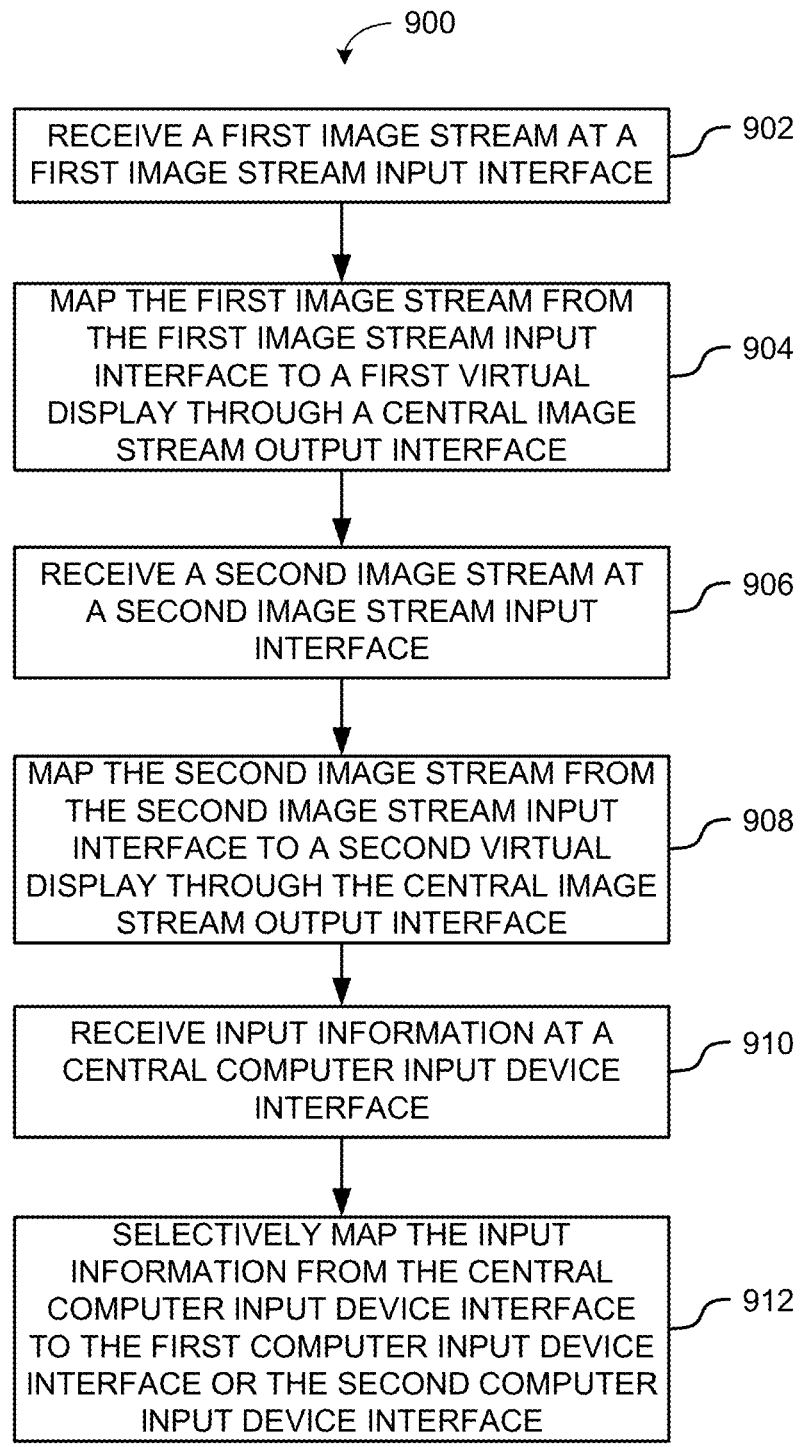
FIG. 17 illustrates an exemplary method for switching control between a plurality of computer systems according to an embodiment of the invention.

FIG. 17 illustrates an exemplary method 900 for switching control between a plurality of computer systems according to an embodiment of the invention. For some embodiments, the method 900 may determine how the system 616 selectively maps image streams and control information from computer input devices.

The method 900 may begin at operation 902, where a first image stream may be received at a first image stream input interface of the system 616. Some time thereafter, the first image stream is selectively mapped to a first virtual display (e.g., the virtual display 602) being outputted through a central image stream output interface at step 904. The image stream output interface may be coupled to an image stream output device (e.g., such as the display 604) that will display the first virtual display.

At step 906, a second image stream may be received at a second image stream input interface of the system 616. Eventually, at step 908, the second image stream is selectively mapped to a second virtual display (e.g., the virtual display 606) being outputted through a central image stream output interface. For some embodiments, the first and second virtual displays may be outputted through the same central image stream output interface and, thus, are being displayed on the same image stream output device coupled to the central image stream output.

At step 910, input information may be received at a central computer input device interface. For some embodiments, the central computer input interface may be coupled to a computer input device (e.g., the keyboard 620 or the mouse 618) configured to control one or more computer systems coupled to the system 616.

At step 912, the input information from the central computer input device may be selectively mapped to either the first computer input device interface (e.g., coupled to the computer system 602) or the second computer input device interface (e.g., coupled to the computer system 624). In accordance with certain embodiments described herein, the selective mapping of the input information may be determined based on action by a computer operator, particularly with respect to the computer input device coupled to the central computer input device interface. For example, the selective mapping may be determined based on the movement and/or position of an input cursor that is controlled by a computer input device coupled to the central computer input device interface. For determination purposes, the movement and/or position of the input cursor may be judged relative to a display region associated with the first virtual display or the second virtual display. It will be understood that subsequent actions by the computer operator may result in the system 616 selective mapping of input information changing from computer input device interface to the other.

For some embodiments in accordance with this invention, the various systems described herein are implemented into a display, such as a video monitor, computer monitor, or projector system, as one or more integrated components. Such an embodiment would, for example, allow a device providing an image stream to directly connect to the display and have various image processing functions applied to the image stream before being shown on the display output. Additionally, for some embodiments where the system is integrated into a display, a mechanism for controlling the system may be provided either through inputs and features integrated into the display (e.g., on screen menu and buttons on the front of the display), or through a separate control mechanism detached from the display, such as touch panel. Optionally, where this control mechanism is separate and detached from the display, the control mechanism may be an overlay configured to be placed over the display output. In some embodiments, the control mechanism is directly connected to the system and system modules to avoid relaying system controls through the output device. For example, if system outputs are to a video input of a computer, the control mechanism is connected directly to the system, so that system control commands are not directed through the computer.

Figure 9C:
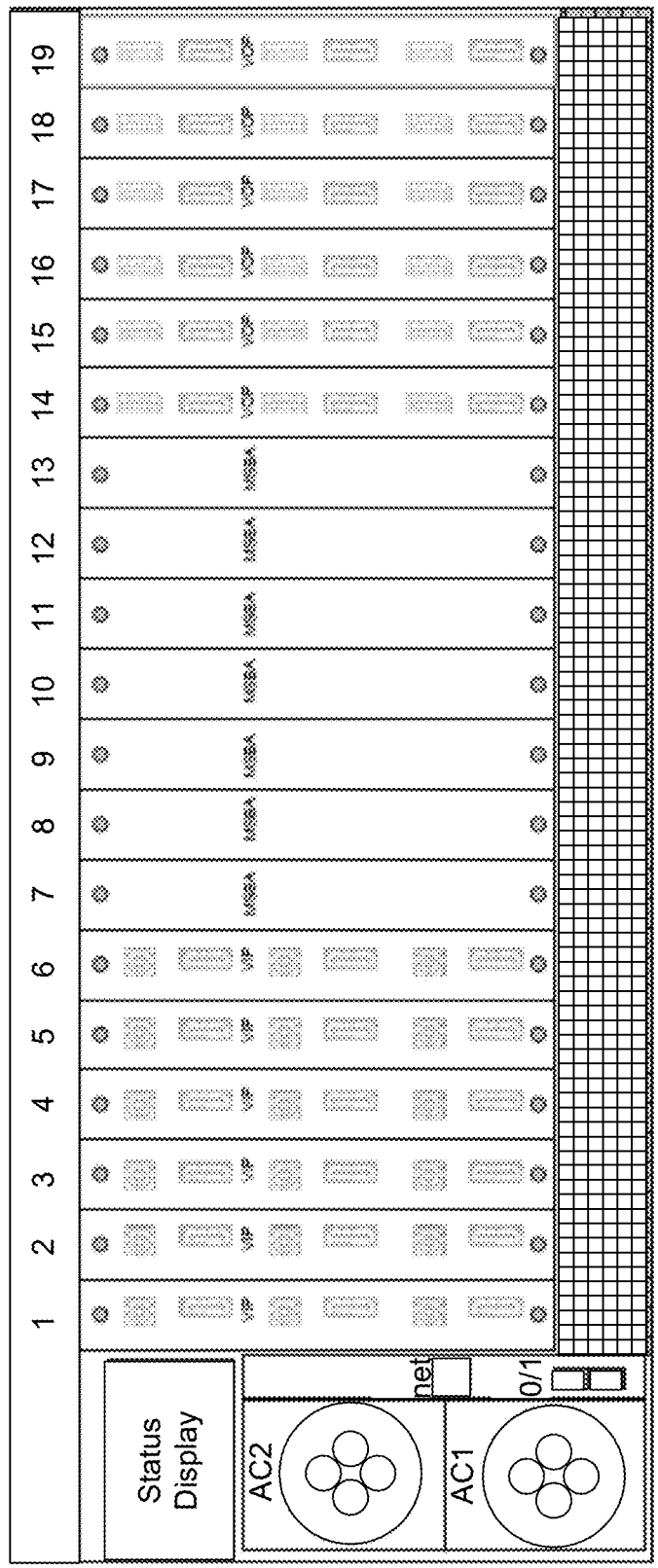
FIG. 9C illustrates an alternative configuration of an exemplary switch fabric chassis according to an embodiment of the invention.

Although some embodiments of the invention have been described as comprising circuit cards, either horizontal or vertically oriented, and making up a switched fabric, alternative embodiments may be employed. For example, FIG. 9C illustrates such an alternative embodiment utilizing vertical 5.25" circuit cards.

Figure 18:
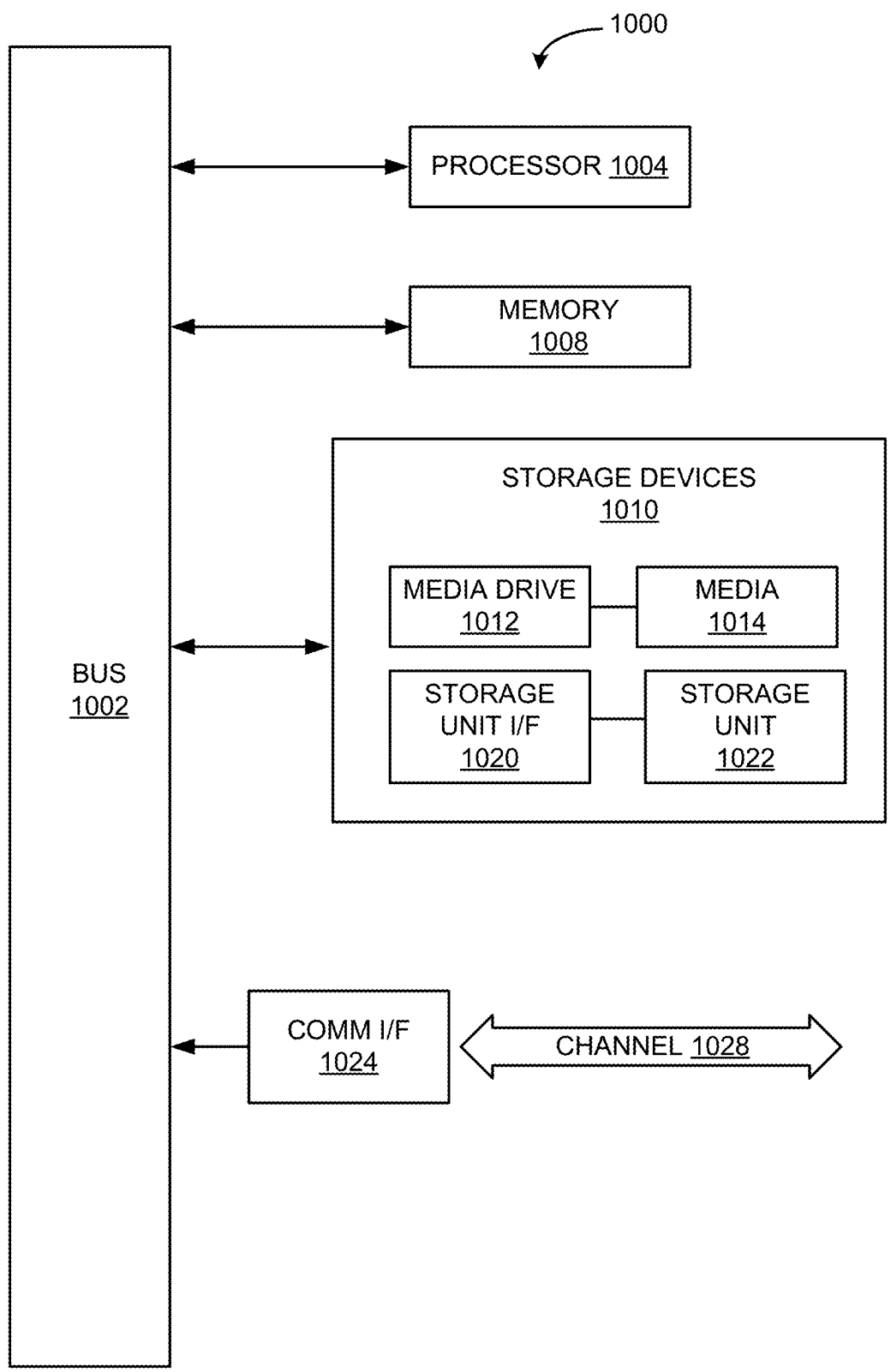
FIG. 18 illustrates an exemplary computing module with which various features of embodiments of the invention may be implemented.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such exemplary computing module is shown in FIG. 18. Various embodiments are described in terms of this exemplary computing module 1000. After reading this description, it will become apparent to a person skilled in the relevant art how to implement the invention using other computing modules or architectures.

Referring now to FIG. 18, computing module 1000 may represent, for example, computing or processing capabilities found within desktop, laptop and notebook computers; hand-held computing devices (FDA's, smart phones, cell phones, palmtops, etc.); mainframes, supercomputers, workstations or servers; or any other type of special-purpose or general-purpose computing devices as may be desirable or appropriate for a given application or environment. Computing module 1000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing module 1000 or to communicate externally.

Computing module 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing module 1000 might likewise include a read only memory ("ROM") or other static storage device coupled to bus 1002 for storing static information and instructions for processor 1004.

The computing module 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a floppy disk drive, a magnetic tape drive, an optical disk drive, a CD or DVD drive (R or RW), or other removable or fixed media drive might be provided. Accordingly, storage media 1014 might include, for example, a hard disk, a floppy disk, magnetic tape, cartridge, optical disk, a CD or DVD, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing module 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 might also include a communications interface 1024. Communications interface 1024 might be used to allow software and data to be transferred between computing module 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1000 to perform features or functions of the present invention as discussed herein.

While various embodiments of the present invention have been described above, it should be understood that they have been presented by way of example only, and not of limitation. Likewise, the various diagrams may depict an exemplary architectural or other configuration for the invention, which is done to aid in understanding the features and functionality that can be included in the invention. The invention is not restricted to the illustrated exemplary architectures or configurations, but the desired features can be implemented using a variety of alternative architectures and configurations. Indeed, it will be apparent to one of ordinary skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for collaboratively switching an image stream input to an image stream output, comprising:

receiving a first command from a first user by way of a collaborative control interface accessible by two or more users simultaneously, wherein the first command relates to configuring a switching matrix in communication with a plurality of image stream input interfaces and an image stream output interface, and wherein the switching matrix is configured to selectively map an image stream input interface of the plurality of image stream input interfaces to the image stream output interface;

receiving a second command from a second user by way of the collaborative control interface, wherein the second command relates to configuring the switching matrix;

storing the first command and the second command in a queue; performing the first command and the second command in accordance with the queue, thereby configuring the switching matrix in accordance with the first command and the second command;

receiving an original image stream from the image stream input interface of the plurality of image stream input interfaces using the switching matrix to selectively map the original image stream to the image stream output interface; and where said original image stream is mapped against said image stream output to form switch fabrics wherein multiple switch fabrics are combined such that an input device coupled to an input port to enable system scaling.

2. The method of claim 1, wherein using the switching matrix to selectively map the original image stream to the image stream output interface comprises:

using the switching matrix to selectively map the original image stream to an image processing module, wherein the image processing module is configured to accept the original image stream from the image stream input interface of the plurality of image stream input interfaces, apply an image processing function to the original image stream, and output a processed image stream; and using the switching matrix to selectively map the processed image stream to the image stream output interface or another image processing module.

3. The method of claim 2, wherein the image processing function comprises an image stream mix function, an image stream scale function, an image stream blend function, an image stream encoding algorithm, or an image stream enhancement function.

4. The method of claim 3, wherein the image stream enhancement function comprises a de-haze function, a de-blur function, a shadow function, a dawn-dusk function, a fusion function, a stabilization function, a thermal turbulence function, an equalization function, an edge detection function, a rain and fog function, or a light optimizing function.

5. The method of claim 3, wherein the image stream enhancement function performed by the image processing module comprises an auto-focus function capable of adjusting focus of an image stream capture device that is coupled to the image stream input interface and producing the image stream.

6. The method of claim 1, wherein storing the first command and the second command in the queue is based on an order in which the first command and the second command are received, based on a first priority of the first command and a second priority of the second command, or based on a first user type of the first user and a second user type of the second user.

7. The method of claim 1, wherein the collaborative control interface comprises a web-based interface that enables configuration of the switching matrix, and wherein the web-based interface is accessible by the users by way of a network connection with the system.

8. The method of claim 1, wherein the first user is an administrative user, wherein the second user is a non-administrative user, and wherein performing the first command and the second command in accordance with the queue comprises performing the first command from the administrative user before the second command from the non-administrative user.

9. The method of claim 1, wherein the switching matrix outputs the original image stream to a virtual display, in a mapped image stream, being outputted to the image stream output interface.

10. The method of claim 9, wherein the first command or the second command includes creating the virtual display, closing the virtual display, resizing the virtual display, repositioning the virtual display within the mapped image stream being outputted to the image stream output interface, or moving the virtual display to another mapped image stream being outputted to another image stream output interface.

11. A method for switching control between a plurality of computer systems, comprising:
receiving a first image stream at a first image stream input interface configured to couple with a first computer system of the plurality of computer systems;
using a switching matrix to map the first image stream from the first image stream input interface to a first virtual display being outputted through a central image stream output interface; receiving a second image stream at a second image stream input interface configured to couple with a second computer system of the plurality of computer systems;
using the switching matrix to map the second image stream from the second image stream input interface to a second virtual display being outputted through the central image stream output interface;
receiving input information from a central computer input device interface;
using the switching matrix to selectively map the control information from the central computer input device interface to a first computer input device interface or a second computer input device interface based on a location of an input cursor with respect to a first display region or a second display region, wherein the first display region and the second display region are being outputted through the central image stream output interface, wherein the first computer input device interface is configured to couple with the first computer and the second computer input device interface is configured to couple with the second computer system, wherein the first virtual display is in the first display region and the second virtual display is the second display region, and wherein the input cursor is controlled by way of the central computer input device interfaces; and where said original image stream is mapped against said image stream output to form switch fabrics wherein multiple switch fabrics are combined such that an input device coupled to an input port to enable system scaling.

12. The method of claim 11, wherein the input cursor is being controlled by a mouse coupled to the central computer input device interface.

13. The method of claim 11, wherein the input cursor is a keyboard cursor being controlled by a keyboard coupled to the central computer input device interface.

14. The method of claim 11, wherein selectively mapping the central computer input device interface to the first computer input interface or the second computer input interface is further based on whether the input cursor is entering or exiting the first display region or the second display region.

15. The method of claim 11, wherein using the switching matrix to map the first image stream input interface to the first virtual display comprises:
mapping the original image stream from the first image stream input interface to an image processing module configured to accept an original image stream from the first image stream input interface, apply an image processing function to the original image stream, and output a processed image stream; and
mapping the processed image stream from the first image processing module to the first virtual display.

16. The method of claim 15, wherein the image processing function comprises an image stream mix function, an image stream scale function, an image stream blend function, an image stream encoding algorithm, or an image stream enhancement function.

17. The method of claim 16, wherein the image stream enhancement function comprises a de-haze function, a de-blur function, a shadow function, a dawn-dusk function, a fusion function, a stabilization function, a thermal turbulence function, an equalization function, an edge detection function, a rain and fog function, or a light optimizing function.

18. The method of claim 17, wherein the image stream enhancement function performed by the image processing module comprises an auto-focus function capable of adjusting focus of an image stream capture device that is coupled to the image stream input interface and producing the image stream.

* * * * *